US012125492B2

(12) United States Patent
Vaillancourt et al.

(10) Patent No.: US 12,125,492 B2
(45) Date of Patent: *Oct. 22, 2024

(54) METHOD AND SYSTEM FOR DECODING LEFT AND RIGHT CHANNELS OF A STEREO SOUND SIGNAL

(71) Applicant: VOICEAGE CORPORATION, Town of Mount Royal (CA)

(72) Inventors: Tommy Vaillancourt, Sherbrooke (CA); Milan Jelinek, Sherbrooke (CA)

(73) Assignee: VOICEAGE COPRORATION (CA)

( * ) Notice: Subject to any disclaimer, the term of this patent is extended or adjusted under 35 U.S.C. 154(b) by 464 days.

This patent is subject to a terminal disclaimer.

(21) Appl. No.: 17/071,299

(22) Filed: Oct. 15, 2020

(65) Prior Publication Data

US 2021/0027794 A1 Jan. 28, 2021

Related U.S. Application Data

(63) Continuation of application No. 15/761,883, filed as application No. PCT/CA2016/051108 on Sep. 22, 2016, now Pat. No. 10,839,813.

(Continued)

(51) Int. Cl.
*G10L 19/008* (2013.01)

(52) U.S. Cl.
CPC .................................. *G10L 19/008* (2013.01)

(58) Field of Classification Search
None
See application file for complete search history.

(56) References Cited

U.S. PATENT DOCUMENTS 5,136,374 A * 8/1992 Jayant ................. H03M 7/3082 375/E7.041
5,581,652 A * 12/1996 Abe ...................... G10L 21/038 704/223

(Continued)

FOREIGN PATENT DOCUMENTS

AU 2009200407 A1 2/2009
AU 2010309838 A1 5/2012

(Continued)

OTHER PUBLICATIONS

3GPP TS 26.290 V9.0.0 Technical Specification, "3rd Generation Partnership Project; Technical Specification Group Service and System Aspects; Audio codec processing functions; Extended Adaptive Multi-Rate—Wideband (AMR-WB +) codec; Transcoding functions (Release 9)", Sep. 2009.

(Continued)

*Primary Examiner* — Neeraj Sharma
(74) *Attorney, Agent, or Firm* — K&L Gates LLP

(57) ABSTRACT

A stereo sound decoding method and system decode left and right channels of a stereo sound signal, using received encoding parameters comprising encoding parameters of a primary channel, encoding parameters of a secondary channel, and a factor β. The primary channel encoding parameters comprise LP filter coefficients of the primary channel. The primary channel is decoded in response to the primary channel encoding parameters. The secondary channel is decoded using one of a plurality of coding models, wherein at least one of the coding models uses the primary channel LP filter coefficients to decode the secondary channel. The decoded primary and secondary channels are time domain up-mixed using the factor β to produce the decoded left and right channels of the stereo sound signal, wherein the factor β determines respective contributions of the primary and (Continued)

secondary channels upon production of the left and right channels.

9 Claims, 18 Drawing Sheets

Related U.S. Application Data

(60) Provisional application No. 62/232,589, filed on Sep. 25, 2015, provisional application No. 62/362,360, filed on Jul. 14, 2016.

(56) References Cited

U.S. PATENT DOCUMENTS

| | | | | |
|---|---|---|---|---|
| 6,104,992 | A * | 8/2000 | Gao | G10L 19/083 704/E19.041 |
| 6,330,533 | B2 | 12/2001 | Su | |
| 6,397,175 | B1 | 5/2002 | Manjunath | |
| 7,283,634 | B2 | 10/2007 | Smith | |
| 7,359,522 | B2 | 4/2008 | Aarts et al. | |
| 7,668,712 | B2 | 2/2010 | Wang | |
| 7,751,572 | B2 | 7/2010 | Villemoes et al. | |
| 7,848,932 | B2 | 12/2010 | Goto et al. | |
| 7,986,789 | B2 | 7/2011 | Purnhagen et al. | |
| 8,103,005 | B2 | 1/2012 | Goodwin et al. | |
| 8,126,152 | B2 | 2/2012 | Taleb | |
| 8,498,421 | B2 | 7/2013 | Jung et al. | |
| 8,577,045 | B2 | 11/2013 | Gibbs | |
| 8,942,989 | B2 | 1/2015 | Liu et al. | |
| 9,009,057 | B2 | 4/2015 | Breebaart et al. | |
| 9,015,038 | B2 | 4/2015 | Vaillancourt et al. | |
| 9,070,358 | B2 | 6/2015 | Den Brinker et al. | |
| 2004/0044524 | A1* | 3/2004 | Minde | G10L 19/12 704/220 |
| 2004/0049379 | A1* | 3/2004 | Thumpudi | G10L 19/008 704/E19.01 |
| 2004/0109471 | A1 | 6/2004 | Minde et al. | |
| 2006/0074642 | A1 | 4/2006 | You | |
| 2006/0233379 | A1 | 10/2006 | Villemoes et al. | |
| 2007/0081597 | A1 | 4/2007 | Disch et al. | |
| 2007/0121954 | A1 | 5/2007 | Kim et al. | |
| 2007/0174062 | A1* | 7/2007 | Mehrotra | G10L 19/008 704/E21.011 |
| 2008/0140426 | A1* | 6/2008 | Kim | G10L 19/087 704/E19.042 |
| 2008/0215317 | A1* | 9/2008 | Fejzo | G10L 19/025 704/E19.044 |
| 2008/0262850 | A1 | 10/2008 | Taleb et al. | |
| 2008/0319739 | A1 | 12/2008 | Mehrotra et al. | |
| 2009/0110201 | A1 | 4/2009 | Kim et al. | |
| 2009/0150162 | A1 | 6/2009 | Goto et al. | |
| 2009/0198356 | A1 | 8/2009 | Goodwin et al. | |
| 2009/0281798 | A1 | 11/2009 | Den Brinker et al. | |
| 2010/0027625 | A1* | 2/2010 | Wik | G10L 19/002 375/240.23 |
| 2010/0241436 | A1 | 9/2010 | Kim et al. | |
| 2011/0224994 | A1* | 9/2011 | Norvell | G10L 19/008 704/500 |
| 2011/0288872 | A1 | 11/2011 | Liu et al. | |
| 2011/0301962 | A1 | 12/2011 | Wu et al. | |
| 2011/0317843 | A1 | 12/2011 | Lang et al. | |
| 2012/0033817 | A1 | 2/2012 | Francois et al. | |
| 2012/0101813 | A1 | 4/2012 | Vaillancourt et al. | |
| 2012/0224702 | A1 | 9/2012 | Den Brinker et al. | |
| 2013/0262130 | A1 | 10/2013 | Ragot et al. | |
| 2013/0332148 | A1* | 12/2013 | Ravelli | G10L 19/022 704/203 |
| 2014/0023197 | A1 | 1/2014 | Xiang et al. | |
| 2014/0112482 | A1 | 4/2014 | Virette et al. | |
| 2014/0219459 | A1 | 8/2014 | Daniel et al. | |
| 2015/0010155 | A1 | 1/2015 | Virette et al. | |
| 2016/0005406 | A1 | 1/2016 | Yen et al. | |
| 2016/0005413 | A1* | 1/2016 | Fellers | G10L 19/012 704/205 |
| 2016/0241981 | A1 | 8/2016 | Law et al. | |
| 2016/0323688 | A1 | 11/2016 | Lee et al. | |
| 2017/0047071 | A1 | 2/2017 | Melkote et al. | |

FOREIGN PATENT DOCUMENTS

| | | | |
|---|---|---|---|
| CN | 1647154 | A | 7/2005 |
| CN | 101253557 | A | 8/2008 |
| CN | 101826326 | A | 9/2010 |
| CN | 101849257 | A | 9/2010 |
| CN | 102577384 | A | 7/2012 |
| CN | 102844808 | | 12/2012 |
| CN | 102947880 | A | 2/2013 |
| CN | 103460283 | | 12/2013 |
| EP | 1 054 575 | | 11/2000 |
| EP | 1801782 | | 6/2007 |
| EP | 1814104 | | 8/2007 |
| EP | 2264698 | | 12/2010 |
| EP | 2405424 | | 1/2012 |
| JP | H01-231523 | A | 9/1989 |
| JP | H02-124597 | | 5/1990 |
| JP | 2002-526798 | | 8/2002 |
| JP | 2004-325633 | | 11/2002 |
| JP | 2005-202248 | A | 7/2005 |
| JP | 2007-183528 | A | 7/2007 |
| JP | 2007-525718 | | 9/2007 |
| JP | 2007-529021 | | 10/2007 |
| JP | 2008-529056 | | 7/2008 |
| JP | 2013-546013 | | 12/2013 |
| JP | 2014-500521 | | 1/2014 |
| KR | 20140004086 | | 10/2014 |
| RU | 2388176 | | 4/2010 |
| RU | 2430430 | | 4/2010 |
| RU | 2450369 | | 5/2012 |
| RU | 2520329 | | 6/2014 |
| RU | 2520402 | | 6/2014 |
| WO | 0019413 | | 4/2000 |
| WO | 02/23527 | | 3/2002 |
| WO | 02/23528 | | 3/2002 |
| WO | 02/23528 | A1 | 3/2002 |
| WO | 2005/059899 | | 6/2005 |
| WO | 2006/035705 | | 4/2006 |
| WO | 2006/059567 | | 6/2006 |
| WO | 2006/089570 | | 8/2006 |
| WO | 2006/091139 | | 8/2006 |
| WO | 2006/108573 | | 10/2006 |
| WO | 2007/013775 | | 2/2007 |
| WO | 2007/096808 | A1 | 8/2007 |
| WO | 2008 132826 | | 11/2008 |
| WO | 2010040522 | | 4/2010 |
| WO | 2010/097748 | | 9/2010 |
| WO | 2015 036351 | | 3/2015 |
| WO | 2017/049396 | | 3/2017 |
| WO | 2017/049397 | | 3/2017 |
| WO | 2017/049398 | | 3/2017 |
| WO | 2017/049400 | | 3/2017 |

OTHER PUBLICATIONS

ETSI TS 126 445 V12.0.0 (Nov. 2014) Technical Specification, "Universal Mobile Telecommunications System (UMTS); LTE; EVS Codec Detailed Algorithmic Description (3GPP TS 26.445 version 12.0.0 Release 12)", Sep. 2014.

Bessette et al., "The Adaptive Multi-Rate Wideband Speech Codec (AMR-WB)," IEEE Trans. Speech and Audio Proc., vol. 10, No. 8, pp. 620-636, Nov. 2002.

Breebaart et al., "Parametric Coding of Stereo Audio", EURASIP Journal on Applied Signal Processing, Issue 9, pp. 1305-1322, 2005.

Moriya et al. "Extended Linear Prediction Tools for Lossless Audio Coding", Proceedings of the IEEE International Conference on Acoustics, Speech and Signal Processing, vol. 3, pp. 1008-1111, 2004.

Neuendorf et al., "The ISO/MPEG Unified Speech and Audio Coding Standard—Consistent High Quality for all Content Types

(56) References Cited

OTHER PUBLICATIONS and at all Bit Rates", J. Audio Eng. Soc., vol. 61, No. 12, pp. 956-977, Dec. 2013.
Van Der Waal et al, "Subband Coding of Stereophonic Digital Audio Signals", Proc. IEEE ICASSP, vol. 5, pp. 3601-3604, Apr. 1991.
Yang et al., "High-Fidelity Multichannel Audio Coding With Karhunen-Loève Transform", IEEE Transactions on Speech and Audio Processing, vol. 11, No. 4, pp. 365-380, Jul. 2003.
PCT International Search Report of International Searching Authority for International Patent Application No. PCT/CA2016/051109, dated Oct. 21, 2016, 3 pages.
PCT Written Opinion of International Searching Authority for International Patent Application No. PCT/CA2016/051109, dated Oct. 21, 2016, 4 pages.
PCT International Search Report of International Searching Authority for International Patent Application No. PCT/CA2016/051106, dated Dec. 20, 2016, 5 pages.
PCT Written Opinion of International Searching Authority for International Patent Application No. PCT/CA2016/051106, dated Dec. 20, 2016, 6 pages.
PCT International Search Report of International Searching Authority for International Patent Application No. PCT/CA2016/051108, dated Dec. 5, 2016, 3 pages.
PCT Written Opinion of International Searching Authority for International Patent Application No. PCT/CA2016/051108, dated Dec. 5, 2016, 4 pages.
PCT International Search Report of International Searching Authority for International Patent Application No. PCT/CA2016/051105, dated Dec. 20, 2016, 4 pages.
PCT Written Opinion of International Searching Authority for International Patent Application No. PCT/CA2016/051105, dated Dec. 20, 2016, 6 pages.
PCT International Search Report of International Searching Authority for International Patent Application No. PCT/CA2016/051107, dated Nov. 14, 2016, 5 pages.
PCT Written Opinion of International Searching Authority for International Patent Application No. PCT/CA2016/051107, dated Nov. 14, 2016, 8 pages.
PCT Corrected Version of the Written Opinion of International Searching Authority for International Patent Application No. PCT/CA2016/051107, dated Nov. 14, 2016 and corrected Dec. 2, 2016, 7 pages.
Federal institute of industrial property (FIIP) Search Report for Russian application No. 2018114898 completed on Feb. 5, 2020 (2 pages).
Federal institute of industrial property (FIIP) Search Report for Russian application No. 2018114899 completed on Feb. 11, 2020 (2 pages).
Federal institute of industrial property (FIIP) Search Report for Russian application No. 2018114901 completed on Feb. 25, 2020 (2 pages).
European Search Report, EP 16847685, dated Jun. 26, 2019, (5 pages).
He et al. "Linear Estimation Based Primary-Ambient Extraction for Stereo Audio Signals" IEEE/ACM Transactions on Audio, Speech, and Language Processing, 22(2)505-517 (2014).
Faller et al. "Binaural cue coding—part II: schemes and applications", IEEE Transactions on Speech and Audio Processing, IEEE Service Center, New York, NY, vol. 11(6)520-531 (2003).
European Search Report, EP 16847684, dated Apr. 3, 2019.
European Search Report, EP 16847683, dated Apr. 4, 2019.
European Search Report, EP 16847687, dated Apr. 12, 2019.
European Search Report, EP 16847686, dated Apr. 10, 2019.
European Extended European Search Report for European Application EP 21201478 mailed from the European Patent Office dated Jan. 27, 2022 (7 pages).
Search Report issued by the Federal Service on Intellectual Property; date of completion Nov. 25, 2021; (2 pages).
Search Report issued by the Federal Service on Intellectual Property; date of completion Nov. 9, 2021; (2 pages).
Japanese Office Action dated Nov. 9, 2020 for Japanese Patent Application No. 2018-515517 (4 pages).
Japanese Office Action dated Nov. 9, 2020 for Japanese Patent Application No. 2018-515518 (4 pages).
Fan, "Design and Verification of FPGA-based MPEG-2/4AAC Audio Decoder", Full-text Database (Master) of Chinese Excellent Doctor and Master Dissertation, period 52, Dec. 15, 2013, 58 pages (Abstract p. 1).
Lang et al., "Novel low complexity coherence estimation and synthesis algorithms for parametric stereo coding", 2012 Proceedings of the 20th European Signal Processing Conference (EUSIPCO), Aug. 27-31, 2012, pp. 2427-2431.
Wu, Lianhuo, "Research and Realization of Parametric Stereo Coding", Chinese Doctoral and Master's Theses Full-text Database (Information Engineering Series), Jul. 15, 2010, 64 pages (Abstract p. 3).
Search Report from Chinese Application No. 201680062618 dated Apr. 25, 2022 (3 pages).
Search Report from Chinese Application No. 2016800625467 dated May 5, 2022 (3 pages).
Search Report from Chinese Application No. 2016800626192 dated May 6, 2022 (3 pages).
Office Action for Chinese Patent Application No. 201680062546.7; dated Nov. 23, 2022; (6 pages).
Marina Bosi, et al., ISO/IEC MPEG-2 advanced audio coding, Journal of the Audio engineering society, 1997 (26 pages).
ATSC Standard: Digital Audio Compression (AC-3). Advanced Television Systems Committee, Doc.A/52:2012; Dec. 17, 2012 (270 pages).
Translation of Office Action dated Sep. 11, 2023 from the Korean Intellectual Property Office for Application No. 10-2018-7008428 (4 pages).
Lee, Taejin et al.; "MPEG Audio New Standard: USAC Technology", MPEG UAC; ;http://doi.org/10.5909/UEB.2011.16.5.693; (12 pages).
Translation of Office Action issued by the Korean Patent Office for Korean Patent Application No. 10-2018-7008429; dated Oct. 11, 2023; (5 pages).
J. Breebaart et al., "MPEG spatial audio coding/MPEG surround: overview and current status". Audio Engineering Society Convention 119, Oct. 10, 2010; (18 pages).
C. Faller, "Parametric coding of spatial audio", PhD Thesis, Ecole Polytechnique Federale de Lausanne, 2004; (180 pages).
B. Fatus, "Parametric Coding for Spatial Audio", Master's Thesis, KTH Stockholm, Sweden, Jul.-Dec. 2015; (70 pages).
Canadian Office Action issued for Canadian Patent Application No. 2,997,332, dated May 6, 2024 (6 pages).

* cited by examiner

METHOD AND SYSTEM FOR DECODING LEFT AND RIGHT CHANNELS OF A STEREO SOUND SIGNAL

CROSS REFERENCE TO RELATED APPLICATIONS

This application is a continuation application of U.S. patent application Ser. No. 15/761,883 filed on Mar. 21, 2018, which is the national phase under 35 U.S.C. § 371 of International Application No. PCT/CA2016/051108 filed on Sep. 22, 2016, which claims priority to and benefit of U.S. Provisional Application No. 62/232,589 filed on Sep. 25, 2015 and U.S. Provisional Application No. 62/362,360 filed on Jul. 14, 2016, the entire disclosures of each of which are incorporated by reference herein.

TECHNICAL FIELD

The present disclosure relates to stereo sound encoding, in particular but not exclusively stereo speech and/or audio encoding capable of producing a good stereo quality in a complex audio scene at low bit-rate and low delay.

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still monophonic but presented to the user's two ears when a headphone is used.

With the newest 3GPP speech coding standard as described in Reference [1], of which the full content is incorporated herein by reference, the quality of the coded sound, for example speech and/or audio that is transmitted and received through a portable handset has been significantly improved. The next natural step is to transmit stereo information such that the receiver gets as close as possible to a real life audio scene that is captured at the other end of the communication link.

In audio codecs, for example as described in Reference [2], of which the full content is incorporated herein by reference, transmission of stereo information is normally used.

For conversational speech codecs, monophonic signal is the norm. When a stereophonic signal is transmitted, the bit-rate often needs to be doubled since both the left and right channels are coded using a monophonic codec. This works well in most scenarios, but presents the drawbacks of doubling the bit-rate and failing to exploit any potential redundancy between the two channels (left and right channels). Furthermore, to keep the overall bit-rate at a reasonable level, a very low bit-rate for each channel is used, thus affecting the overall sound quality.

A possible alternative is to use the so-called parametric stereo as described in Reference [6], of which the full content is incorporated herein by reference. Parametric stereo sends information such as inter-aural time difference (ITD) or inter-aural intensity differences (IID), for example. The latter information is sent per frequency band and, at low bit-rate, the bit budget associated to stereo transmission is not sufficiently high to allow these parameters to work efficiently.

Transmitting a panning factor could help to create a basic stereo effect at low bit-rate, but such a technique does nothing to preserve the ambiance and presents inherent limitations. Too fast an adaptation of the panning factor becomes disturbing to the listener while too slow an adaptation of the panning factor does not reflect the real position of the speakers, which makes it difficult to obtain a good quality in case of interfering talkers or when fluctuation of the background noise is important. Currently, encoding conversational stereo speech with a decent quality for all possible audio scenes requires a minimum bit-rate of around 24 kb/s for wideband (WB) signals; below that bit-rate, the speech quality starts to suffer.

With the ever increasing globalization of the workforce and splitting of work teams over the globe, there is a need for improvement of the communications. For example, participants to a teleconference may be in different and distant locations. Some participants could be in their cars, others could be in a large anechoic room or even in their living room. In fact, all participants wish to feel like they have a face-to-face discussion. Implementing stereo speech, more generally stereo sound in portable devices would be a great step in this direction.

SUMMARY

According to a first aspect, the present disclosure is concerned with a stereo sound decoding method for decoding left and right channels of a stereo sound signal, comprising: receiving encoding parameters comprising encoding parameters of a primary channel, encoding parameters of a secondary channel, and a factor β, wherein the primary channel encoding parameters comprise LP filter coefficients of the primary channel; decoding the primary channel in response to the primary channel encoding parameters; decoding the secondary channel using one of a plurality of coding models, wherein at least one of the coding models uses the primary channel LP filter coefficients to decode the secondary channel; and time domain up-mixing the decoded primary and secondary channels using the factor β to produce the decoded left and right channels of the stereo sound signal, wherein the factor β determines respective contributions of the primary and secondary channels upon production of the left and right channels.

According to a second aspect, there is provided a stereo sound decoding system for decoding left and right channels of a stereo sound signal, comprising: means for receiving encoding parameters comprising encoding parameters of a primary channel, encoding parameters of a secondary channel, and a factor β, wherein the primary channel encoding parameters comprise LP filter coefficients of the primary channel; a decoder of the primary channel in response to the primary channel encoding parameters; a decoder of the secondary channel using one of a plurality of coding models, wherein at least one of the coding models uses the primary channel LP filter coefficients to decode the secondary channel; and a time domain up-mixer of the decoded primary and secondary channels using the factor β to produce the decoded left and right channels of the stereo sound signal, wherein the factor β determines respective contributions of the primary and secondary channels upon production of the left and right channels.

According to a third aspect, there is provided a stereo sound decoding system for decoding left and right channels of a stereo sound signal, comprising: at least one processor; and a memory coupled to the processor and comprising non-transitory instructions that when executed cause the processor to implement: means for receiving encoding parameters comprising encoding parameters of a primary channel, encoding parameters of a secondary channel, and a factor β, wherein the primary channel encoding parameters comprise LP filter coefficients of the primary channel; a decoder of the primary channel in response to the primary channel encoding parameters; a decoder of the secondary channel using one of a plurality of coding models, wherein at least one of the coding models uses the primary channel LP filter coefficients to decode the secondary channel; and a time domain up-mixer of the decoded primary and secondary channels using the factor β to produce the decoded left and right channels of the stereo sound signal, wherein the factor determines respective contributions of the primary and secondary channels upon production of the left and right channels.

A further aspect is concerned with a stereo sound decoding system for decoding left and right channels of a stereo sound signal, comprising: at least one processor; and a memory coupled to the processor and comprising non-transitory instructions that when executed cause the processor to: receive encoding parameters comprising encoding parameters of a primary channel, encoding parameters of a secondary channel, and a factor β, wherein the primary channel encoding parameters comprise LP filter coefficients of the primary channel; decode the primary channel in response to the primary channel encoding parameters; decode the secondary channel using one of a plurality of coding models, wherein at least one of the coding models uses the primary channel LP filter coefficients to decode the secondary channel; and time domain up-mix the decoded primary and secondary channels using the factor β to produce the decoded left and right channels of the stereo sound signal, wherein the factor β determines respective contributions of the primary and secondary channels upon production of the left and right channels.

The present disclosure still further relates to a processor-readable memory comprising non-transitory instructions that, when executed, cause a processor to implement the operations of the above described method.

The foregoing and other objects, advantages and features of the stereo sound decoding method and system for decoding left and right channels of a stereo sound signal will become more apparent upon reading of the following non-restrictive description of illustrative embodiments thereof, given by way of example only with reference to the accompanying drawings.

DETAILED DESCRIPTION

The present disclosure is concerned with production and transmission, with a low bit-rate and low delay, of a realistic representation of stereo sound content, for example speech and/or audio content, from, in particular but not exclusively, a complex audio scene. A complex audio scene includes situations in which (a) the correlation between the sound signals that are recorded by the microphones is low, (b) there is an important fluctuation of the background noise, and/or (c) an interfering talker is present. Examples of complex audio scenes comprise a large anechoic conference room with an NB microphones configuration, a small echoic room with binaural microphones, and a small echoic room with a mono/side microphones set-up. All these room configurations could include fluctuating background noise and/or interfering talkers.

Known stereo sound codecs, such as 3GPP AMR-WB+ as described in Reference [7], of which the full content is incorporated herein by reference, are inefficient for coding sound that is not close to the monophonic model, especially at low bit-rate. Certain cases are particularly difficult to encode using existing stereo techniques. Such cases include:

LAAB (Large anechoic room with NB microphones set-up);

SEBI (Small echoic room with binaural microphones set-up); and

SEMS (Small echoic room with Mono/Side microphones setup).

Adding a fluctuating background noise and/or interfering talkers makes these sound signals even harder to encode at low bit-rate using stereo dedicated techniques, such as parametric stereo. A fall back to encode such signals is to use two monophonic channels, hence doubling the bit-rate and network bandwidth being used.

The latest 3GPP EVS conversational speech standard provides a bit-rate range from 7.2 kb/s to 96 kb/s for wideband (WB) operation and 9.6 kb/s to 96 kb/s for super wideband (SWB) operation. This means that the three lowest dual mono bit-rates using EVS are 14.4, 16.0 and 19.2 kb/s for WB operation and 19.2, 26.3 and 32.8 kb/s for SWB operation. Although speech quality of the deployed 3GPP AMR-WB as described in Reference [3], of which the full content is incorporated herein by reference, improves over its predecessor codec, the quality of the coded speech at 7.2 kb/s in noisy environment is far from being transparent and, therefore, it can be anticipated that the speech quality of dual mono at 14.4 kb/s would also be limited. At such low bit-rates, the bit-rate usage is maximized such that the best possible speech quality is obtained as often as possible. With the stereo sound encoding method and system as disclosed in the following description, the minimum total bit-rate for conversational stereo speech content, even in case of complex audio scenes, should be around 13 kb/s for WB and 15.0 kb/s for SWB. At bit-rates that are lower than the bit-rates used in a dual mono approach, the quality and the intelligibility of stereo speech is greatly improved for complex audio scenes.

Figure 1:
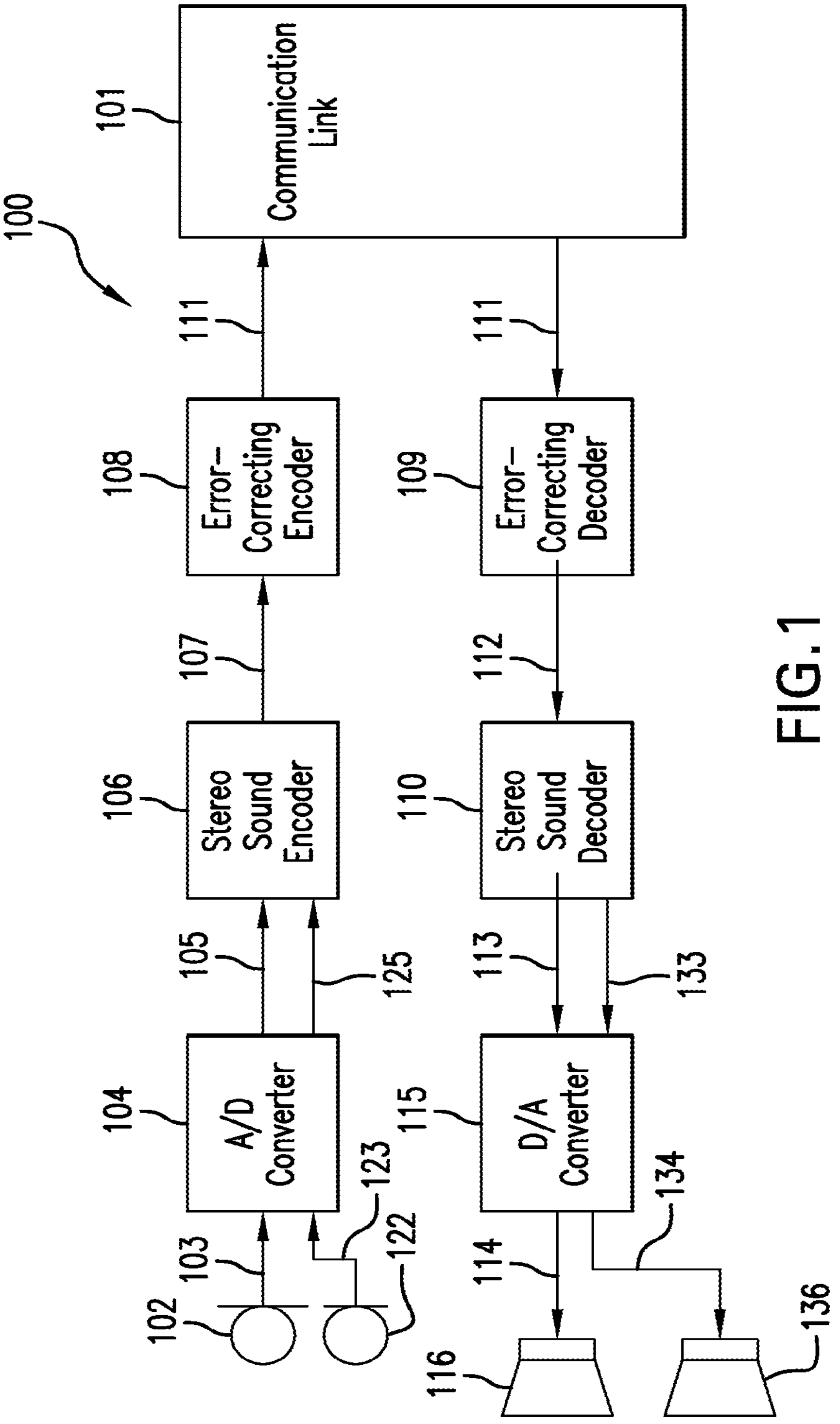
FIG. 1 is a schematic block diagram of a stereo sound processing and communication system depicting a possible context of implementation of stereo sound encoding method and system as disclosed in the following description.

FIG. 1 is a schematic block diagram of a stereo sound processing and communication system 100 depicting a possible context of implementation of the stereo sound encoding method and system as disclosed in the following description.

The stereo sound processing and communication system 100 of FIG. 1 supports transmission of a stereo sound signal across a communication link 101. The communication link 101 may comprise, for example, a wire or an optical fiber link. Alternatively, the communication link 101 may comprise at least in part a radio frequency link. The radio frequency link often supports multiple, simultaneous communications requiring shared bandwidth resources such as may be found with cellular telephony. Although not shown, the communication link 101 may be replaced by a storage device in a single device implementation of the processing and communication system 100 that records and stores the encoded stereo sound signal for later playback.

Still referring to FIG. 1, for example a pair of microphones 102 and 122 produces the left 103 and right 123 channels of an original analog stereo sound signal detected, for example, in a complex audio scene. As indicated in the foregoing description, the sound signal may comprise, in particular but not exclusively, speech and/or audio. The microphones 102 and 122 may be arranged according to an NB, binaural or Mono/side set-up.

The left 103 and right 123 channels of the original analog sound signal are supplied to an analog-to-digital (ND) converter 104 for converting them into left 105 and right 125 channels of an original digital stereo sound signal. The left 105 and right 125 channels of the original digital stereo sound signal may also be recorded and supplied from a storage device (not shown).

A stereo sound encoder 106 encodes the left 105 and right 125 channels of the digital stereo sound signal thereby producing a set of encoding parameters that are multiplexed under the form of a bitstream 107 delivered to an optional error-correcting encoder 108. The optional error-correcting encoder 108, when present, adds redundancy to the binary representation of the encoding parameters in the bitstream 107 before transmitting the resulting bitstream 111 over the communication link 101.

On the receiver side, an optional error-correcting decoder 109 utilizes the above mentioned redundant information in the received digital bitstream 111 to detect and correct errors that may have occurred during transmission over the communication link 101, producing a bitstream 112 with received encoding parameters. A stereo sound decoder 110 converts the received encoding parameters in the bitstream 112 for creating synthesized left 113 and right 133 channels of the digital stereo sound signal. The left 113 and right 133 channels of the digital stereo sound signal reconstructed in the stereo sound decoder 110 are converted to synthesized left 114 and right 134 channels of the analog stereo sound signal in a digital-to-analog (D/A) converter 115.

The synthesized left 114 and right 134 channels of the analog stereo sound signal are respectively played back in a pair of loudspeaker units 116 and 136. Alternatively, the left 113 and right 133 channels of the digital stereo sound signal from the stereo sound decoder 110 may also be supplied to and recorded in a storage device (not shown).

The left 105 and right 125 channels of the original digital stereo sound signal of FIG. 1 corresponds to the left L and right R channels of FIGS. 2, 3, 4, 8, 9, 13, 14, 15, 17 and 18. Also, the stereo sound encoder 106 of FIG. 1 corresponds to the stereo sound encoding system of FIGS. 2, 3, 8, 15, 17 and 18.

The stereo sound encoding method and system in accordance with the present disclosure are two-fold; first and second models are provided.

Figure 2:
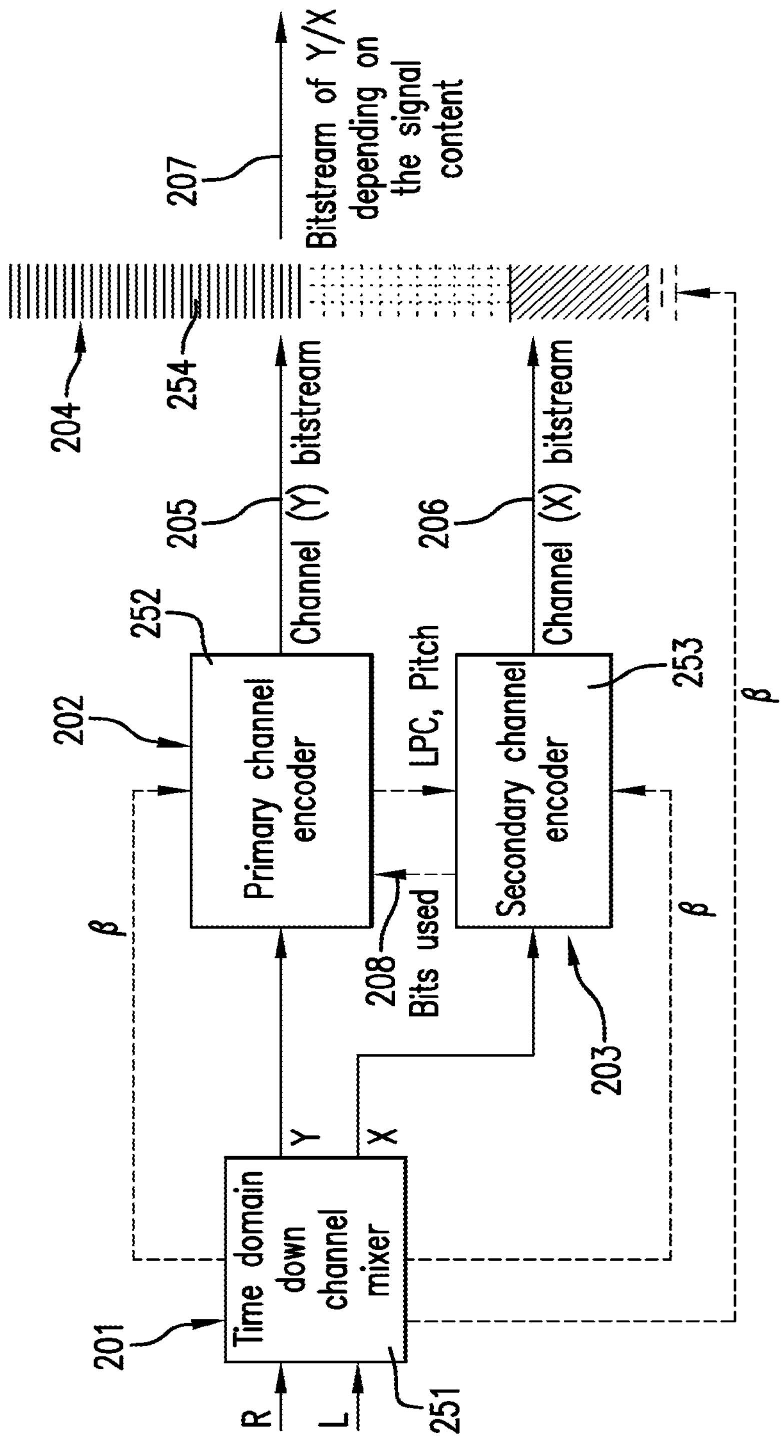
FIG. 2 is a block diagram illustrating concurrently a stereo sound encoding method and system according to a first model, presented as an integrated stereo design.

FIG. 2 is a block diagram illustrating concurrently the stereo sound encoding method and system according to the first model, presented as an integrated stereo design based on the EVS core.

Referring to FIG. 2, the stereo sound encoding method according to the first model comprises a time domain down mixing operation 201, a primary channel encoding operation 202, a secondary channel encoding operation 203, and a multiplexing operation 204.

To perform the time-domain down mixing operation 201, a channel mixer 251 mixes the two input stereo channels (right channel R and left channel L) to produce a primary channel Y and a secondary channel X.

To carry out the secondary channel encoding operation 203, a secondary channel encoder 253 selects and uses a minimum number of bits (minimum bit-rate) to encode the secondary channel X using one of the encoding modes as defined in the following description and produce a corresponding secondary channel encoded bitstream 206. The associated bit budget may change every frame depending on frame content.

To implement the primary channel encoding operation 202, a primary channel encoder 252 is used. The secondary channel encoder 253 signals to the primary channel encoder 252 the number of bits 208 used in the current frame to encode the secondary channel X. Any suitable type of encoder can be used as the primary channel encoder 252. As a non-limitative example, the primary channel encoder 252 can be a CELP-type encoder. In this illustrative embodiment, the primary channel CELP-type encoder is a modified version of the legacy EVS encoder, where the EVS encoder is modified to present a greater bitrate scalability to allow flexible bit rate allocation between the primary and secondary channels. In this manner, the modified EVS encoder will be able to use all the bits that are not used to encode the secondary channel X for encoding, with a corresponding bit-rate, the primary channel Y and produce a corresponding primary channel encoded bitstream 205.

A multiplexer 254 concatenates the primary channel bitstream 205 and the secondary channel bitstream 206 to form a multiplexed bitstream 207, to complete the multiplexing operation 204.

In the first model, the number of bits and corresponding bit-rate (in the bitstream 206) used to encode the secondary channel X is smaller than the number of bits and corresponding bit-rate (in the bitstream 205) used to encode the primary channel Y. This can be seen as two (2) variable-bit-rate channels wherein the sum of the bit-rates of the two channels X and Y represents a constant total bit-rate. This approach may have different flavors with more or less emphasis on the primary channel Y. According to a first example, when a maximum emphasis is put on the primary channel Y, the bit budget of the secondary channel X is aggressively forced to a minimum. According to a second example, if less emphasis is put on the primary channel Y, then the bit budget for the secondary channel X may be made more constant, meaning that the average bit-rate of the secondary channel X is slightly higher compared to the first example.

It is reminded that the right R and left L channels of the input digital stereo sound signal are processed by successive frames of a given duration which may corresponds to the duration of the frames used in EVS processing. Each frame comprises a number of samples of the right R and left L channels depending on the given duration of the frame and the sampling rate being used.

Figure 3:
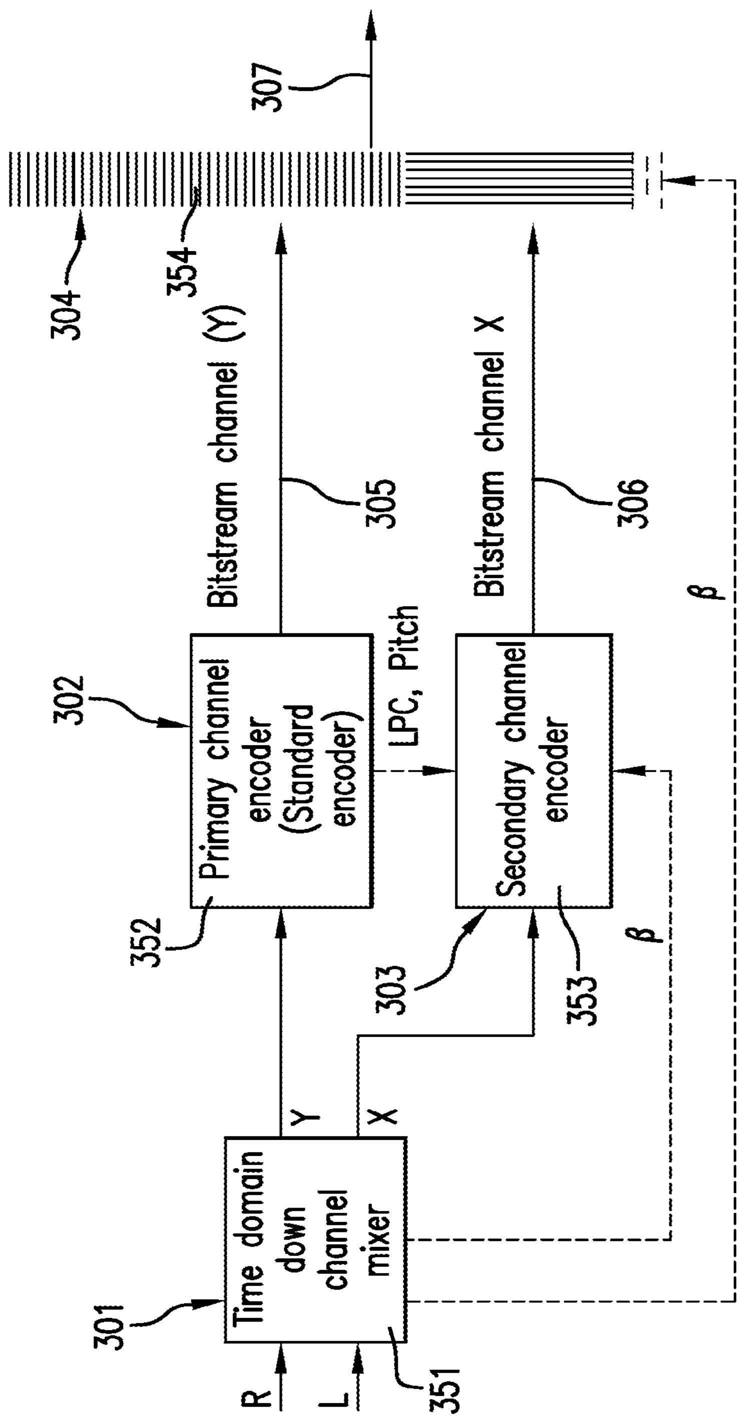
FIG. 3 is a block diagram illustrating concurrently a stereo sound encoding method and system according to a second model, presented as an embedded model.

FIG. 3 is a block diagram illustrating concurrently the stereo sound encoding method and system according to the second model, presented as an embedded model.

Referring to FIG. 3, the stereo sound encoding method according to the second model comprises a time domain down mixing operation 301, a primary channel encoding operation 302, a secondary channel encoding operation 303, and a multiplexing operation 304.

To complete the time domain down mixing operation 301, a channel mixer 351 mixes the two input right R and left L channels to form a primary channel Y and a secondary channel X.

In the primary channel encoding operation 302, a primary channel encoder 352 encodes the primary channel Y to produce a primary channel encoded bitstream 305. Again, any suitable type of encoder can be used as the primary channel encoder 352. As a non-limitative example, the primary channel encoder 352 can be a CELP-type encoder. In this illustrative embodiment, the primary channel encoder 352 uses a speech coding standard such as the legacy EVS mono encoding mode or the AMR-WB-IO encoding mode, for instance, meaning that the monophonic portion of the bitstream 305 would be interoperable with the legacy EVS, the AMR-WB-IO or the legacy AMR-WB decoder when the bit-rate is compatible with such decoder. Depending on the encoding mode being selected, some adjustment of the primary channel Y may be required for processing through the primary channel encoder 352.

In the secondary channel encoding operation 303, a secondary channel encoder 353 encodes the secondary channel X at lower bit-rate using one of the encoding modes as defined in the following description. The secondary channel encoder 353 produces a secondary channel encoded bitstream 306.

To perform the multiplexing operation 304, a multiplexer 354 concatenates the primary channel encoded bitstream 305 with the secondary channel encoded bitstream 306 to form a multiplexed bitstream 307. This is called an embedded model, because the secondary channel encoded bitstream 306 associated to stereo is added on top of an inter-operable bitstream 305. The secondary channel bitstream 306 can be stripped-off the multiplexed stereo bitstream 307 (concatenated bitstreams 305 and 306) at any moment resulting in a bitstream decodable by a legacy codec as described herein above, while a user of a newest version of the codec would still be able to enjoy the complete stereo decoding.

The above described first and second models are in fact close one to another. The main difference between the two models is the possibility to use a dynamic bit allocation between the two channels Y and X in the first model, while bit allocation is more limited in the second model due to interoperability considerations.

Examples of implementation and approaches used to achieve the above described first and second models are given in the following description.

1) Time Domain Down Mixing

As expressed in the foregoing description, the known stereo models operating at low bit-rate have difficulties with coding speech that is not close to the monophonic model. Traditional approaches perform down mixing in the frequency domain, per frequency band, using for example a correlation per frequency band associated with a Principal Component Analysis (pca) using for example a Karhunen-Loève Transform (klt), to obtain two vectors, as described in references [4] and [5], of which the full contents are herein incorporated by reference. One of these two vectors incorporates all the highly correlated content while the other vector defines all content that is not much correlated. The best known method to encode speech at low-bit rates uses a time domain codec, such as a CELP (Code-Excited Linear Prediction) codec, in which known frequency-domain solutions are not directly applicable. For that reason, while the idea behind the pca/klt per frequency band is interesting, when the content is speech, the primary channel Y needs to be converted back to time domain and, after such conversion, its content no longer looks like traditional speech, especially in the case of the above described configurations using a speech-specific model such as CELP. This has the effect of reducing the performance of the speech codec. Moreover, at low bit-rate, the input of a speech codec should be as close as possible to the codec's inner model expectations.

Starting with the idea that an input of a low bit-rate speech codec should be as close as possible to the expected speech signal, a first technique has been developed. The first technique is based on an evolution of the traditional pca/klt scheme. While the traditional scheme computes the pca/klt per frequency band, the first technique computes it over the whole frame, directly in the time domain. This works adequately during active speech segments, provided there is no background noise or interfering talker. The pca/klt scheme determines which channel (left L or right R channel) contains the most useful information, this channel being sent to the primary channel encoder. Unfortunately, the pca/klt scheme on a frame basis is not reliable in the presence of background noise or when two or more persons are talking with each other. The principle of the pca/klt scheme involves selection of one input channel (R or L) or the other, often leading to drastic changes in the content of the primary channel to be encoded. At least for the above reasons, the first technique is not sufficiently reliable and, accordingly, a second technique is presented herein for overcoming the deficiencies of the first technique and allow for a smoother transition between the input channels. This second technique will be described hereinafter with reference to FIGS. 4-9.

Figure 4:
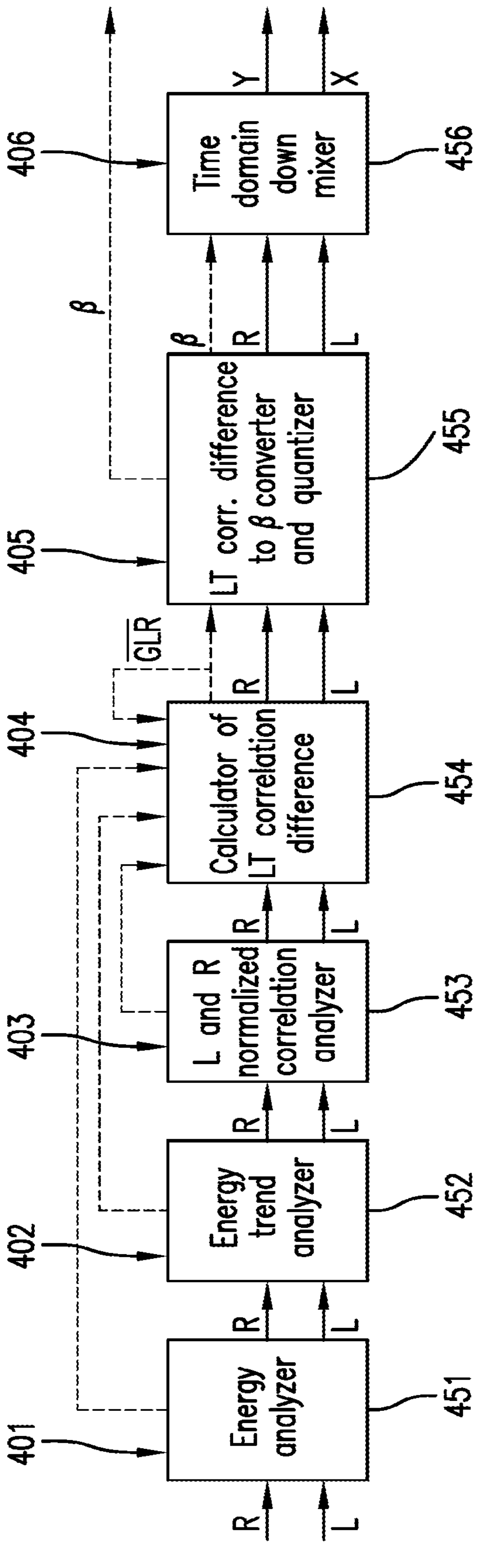
FIG. 4 is a block diagram showing concurrently sub-operations of a time domain down mixing operation of the stereo sound encoding method of FIGS. 2 and 3, and modules of a channel mixer of the stereo sound encoding system of FIGS. 2 and 3.

Referring to FIG. 4, the operation of time domain down mixing 201/301 (FIGS. 2 and 3) comprises the following sub-operations: an energy analysis sub-operation 401, an energy trend analysis sub-operation 402, an L and R channel normalized correlation analysis sub-operation 403, a long-term (LT) correlation difference calculating sub-operation 404, a long-term correlation difference to factor β conversion and quantization sub-operation 405 and a time domain down mixing sub-operation 406.

Keeping in mind the idea that the input of a low bit-rate sound (such as speech and/or audio) codec should be as homogeneous as possible, the energy analysis sub-operation 401 is performed in the channel mixer 252/351 by an energy analyzer 451 to first determine, by frame, the rms (Root Mean Square) energy of each input channel R and L using relations (1):

$$rms_L(t)=\sqrt{\frac{\sum_{i=0}^{N-1} L(i)^2}{N}}\,;\; rms_R(t)=\sqrt{\frac{\sum_{i=0}^{N-1} R(i)^2}{N}}, \tag{1}$$

where the subscripts L and R stand for the left and right channels respectively, L(i) stands for sample i of channel L, R(i) stands for sample i of channel R, N corresponds to the number of samples per frame, and t stands for a current frame.

The energy analyzer 451 then uses the rms values of relations (1) to determine long-term rms values $\overline{rms}$ for each channel using relations (2):

$$\overline{rms}_L(t)=0.6\cdot\overline{rms}_L(t_{-1})+0.4\cdot rms_L;\overline{rms}_R(t)=0.6\cdot\overline{rms}_R(t_{-1})+0.4\cdot rms_R, \tag{2}$$

where t represents the current frame and $t_{-1}$ the previous frame.

To perform the energy trend analysis sub-operation 402, an energy trend analyzer 452 of the channel mixer 251/351 uses the long-term rms values $\overline{rms}$ to determine the trend of the energy in each channel L and R $\overline{rms}$_dt using relations (3):

$$\overline{rms}\_dt_L=\overline{rms}_L(t)-\overline{rms}_L(t_{-1});\ \overline{rms}\_dt_R=\overline{rms}_R(t)-\overline{rms}_R(t_{-1}). \tag{3}$$

The trend of the long-term rms values is used as information that shows if the temporal events captured by the microphones are fading-out or if they are changing channels. The long-term rms values and their trend are also used to determine a speed of convergence a of a long-term correlation difference as will be described herein after.

To perform the channels L and R normalized correlation analysis sub-operation 403, an L and R normalized correlation analyzer 453 computes a correlation $G_{L|R}$ for each of the left L and right R channels normalized against a monophonic signal version m(i) of the sound, such as speech and/or audio, in the frame t using relations (4):

$$G_L(t)=\frac{\sum_{i=0}^{N-1}(L(i)\cdot m(i))}{\sum_{i=0}^{N-1} m(i)^2},\; G_R(t)=\frac{\sum_{i=0}^{N-1}(R(i)\cdot m(i))}{\sum_{i=0}^{N-1} m(i)^2},\; m(i)=\left(\frac{L(i)+R(i)}{2}\right), \tag{4}$$

where N, as already mentioned, corresponds to the number of samples in a frame, and t stands for the current frame. In the current embodiment, all normalized correlations and rms values determined by relations 1 to 4 are calculated in the time domain, for the whole frame. In another possible configuration, these values can be computed in the frequency domain. For instance, the techniques described herein, which are adapted to sound signals having speech characteristics, can be part of a larger framework which can switch between a frequency domain generic stereo audio coding method and the method described in the present disclosure. In this case computing the normalized correlations and rms values in the frequency domain may present some advantage in terms of complexity or code re-use.

To compute the long-term (LT) correlation difference in sub-operation 404, a calculator 454 computes for each channel L and R in the current frame smoothed normalized correlations using relations (5):

$$\overline{G_L}(t)=\alpha\cdot\overline{G_L}(t_{-1})+(1-\alpha)\cdot G_L(t)\text{ and }\overline{G_R}(t)=\alpha\cdot\overline{G_R}(t_{-1})+(1-\alpha)\cdot G_R(t), \tag{5}$$

where α is the above mentioned speed of convergence. Finally, the calculator 454 determines the long-term (LT) correlation difference $\overline{G_{LR}}$ using relation (6):

$$\overline{G_{LR}}(t)=\overline{G_L}(t)-\overline{G_R}(t). \tag{6}$$

In one example embodiment, the speed of convergence a may have a value of 0.8 or 0.5 depending on the long-term energies computed in relations (2) and the trend of the long-term energies as computed in relations (3). For instance, the speed of convergence a may have a value of 0.8 when the long-term energies of the left L and right R channels evolve in a same direction, a difference between the long-term correlation difference $\overline{G_{LR}}$ at frame t and the long-term correlation difference $\overline{G_{LR}}$ at frame $t_{-1}$ is low (below 0.31 for this example embodiment), and at least one of the long-term rms values of the left L and right R channels is above a certain threshold (2000 in this example embodiment). Such cases mean that both channels L and R are evolving smoothly, there is no fast change in energy from one channel to the other, and at least one channel contains a meaningful level of energy. Otherwise, when the long-term energies of the right R and left L channels evolve in different directions, when the difference between the long-term correlation differences is high, or when the two right R and left L channels have low energies, then a will be set to 0.5 to increase a speed of adaptation of the long-term correlation difference $\overline{G_{LR}}$.

To carry out the conversion and quantization sub-operation 405, once the long-term correlation difference $\overline{G_{LR}}$ has been properly estimated in calculator 454, the converter and quantizer 455 converts this difference into a factor β that is quantized, and supplied to (a) the primary channel encoder 252 (FIG. 2), (b) the secondary channel encoder 253/353 (FIGS. 2 and 3), and (c) the multiplexer 254/354 (FIGS. 2 and 3) for transmission to a decoder within the multiplexed bitstream 207/307 through a communication link such as 101 of FIG. 1.

The factor β represents two aspects of the stereo input combined into one parameter. First, the factor β represents a proportion or contribution of each of the right R and left L channels that are combined together to create the primary channel Y and, second, it can also represent an energy scaling factor to apply to the primary channel Y to obtain a primary channel that is close in the energy domain to what a monophonic signal version of the sound would look like. Thus, in the case of an embedded structure, it allows the primary channel Y to be decoded alone without the need to receive the secondary bitstream 306 carrying the stereo parameters. This energy parameter can also be used to rescale the energy of the secondary channel X before encoding thereof, such that the global energy of the secondary channel X is closer to the optimal energy range of the secondary channel encoder. As shown on FIG. 2, the energy information intrinsically present in the factor β may also be used to improve the bit allocation between the primary and the secondary channels.

The quantized factor β may be transmitted to the decoder using an index. Since the factor β can represent both (a) respective contributions of the left and right channels to the primary channel and (b) an energy scaling factor to apply to the primary channel to obtain a monophonic signal version of the sound or a correlation/energy information that helps to allocate more efficiently the bits between the primary channel Y and the secondary channel X, the index transmitted to the decoder conveys two distinct information elements with a same number of bits.

To obtain a mapping between the long-term correlation difference $\overline{G_{LR}(t)}$ and the factor β, in this example embodiment, the converter and quantizer 455 first limits the long-term correlation difference $\overline{G_{LR}(t)}$ between −1.5 to 1.5 and then linearizes this long-term correlation difference between 0 and 2 to get a temporary linearized long-term correlation difference $G_{LR}'(t)$ as shown by relation (7):

$$G'_{LR}(t) = \begin{cases} 0, & \overline{G_{LR}(t)} \le -1.5 \\ \frac{2}{3} \cdot \overline{G_{LR}(t)} + 1.0, & -1.5 < \overline{G_{LR}(t)} < 1.5 \\ 2, & \overline{G_{LR}(t)} \ge 1.5 \end{cases} \tag{7}$$

In an alternative implementation, it may be decided to use only a part of the space filled with the linearized long-term correlation difference $G_{LR}'(t)$, by further limiting its values between, for example, 0.4 and 0.6. This additional limitation would have the effect to reduce the stereo image localization, but to also save some quantization bits. Depending on the design choice, this option can be considered.

After the linearization, the converter and quantizer 455 performs a mapping of the linearized long-term correlation difference $G_{LR}'(t)$ into the "cosine" domain using relation (8):

$$\beta(t) = \frac{1}{2} \cdot \left(1 - \cos\left(\pi \cdot \frac{G'_{LR}(t)}{2}\right)\right) \tag{8}$$

To perform the time domain down mixing sub-operation 406, a time domain down mixer 456 produces the primary channel Y and the secondary channel X as a mixture of the right R and left L channels using relations (9) and (10):

$$Y(i)=R(i)\cdot(1-\beta(t))+L(i)\cdot\beta(t) \tag{9}$$

$$X(i)=L(i)\cdot(1-\beta(t))-R(i)\cdot\beta(t) \tag{10}$$

where i=0, . . . , N−1 is the sample index in the frame and t is the frame index.

Figure 13:
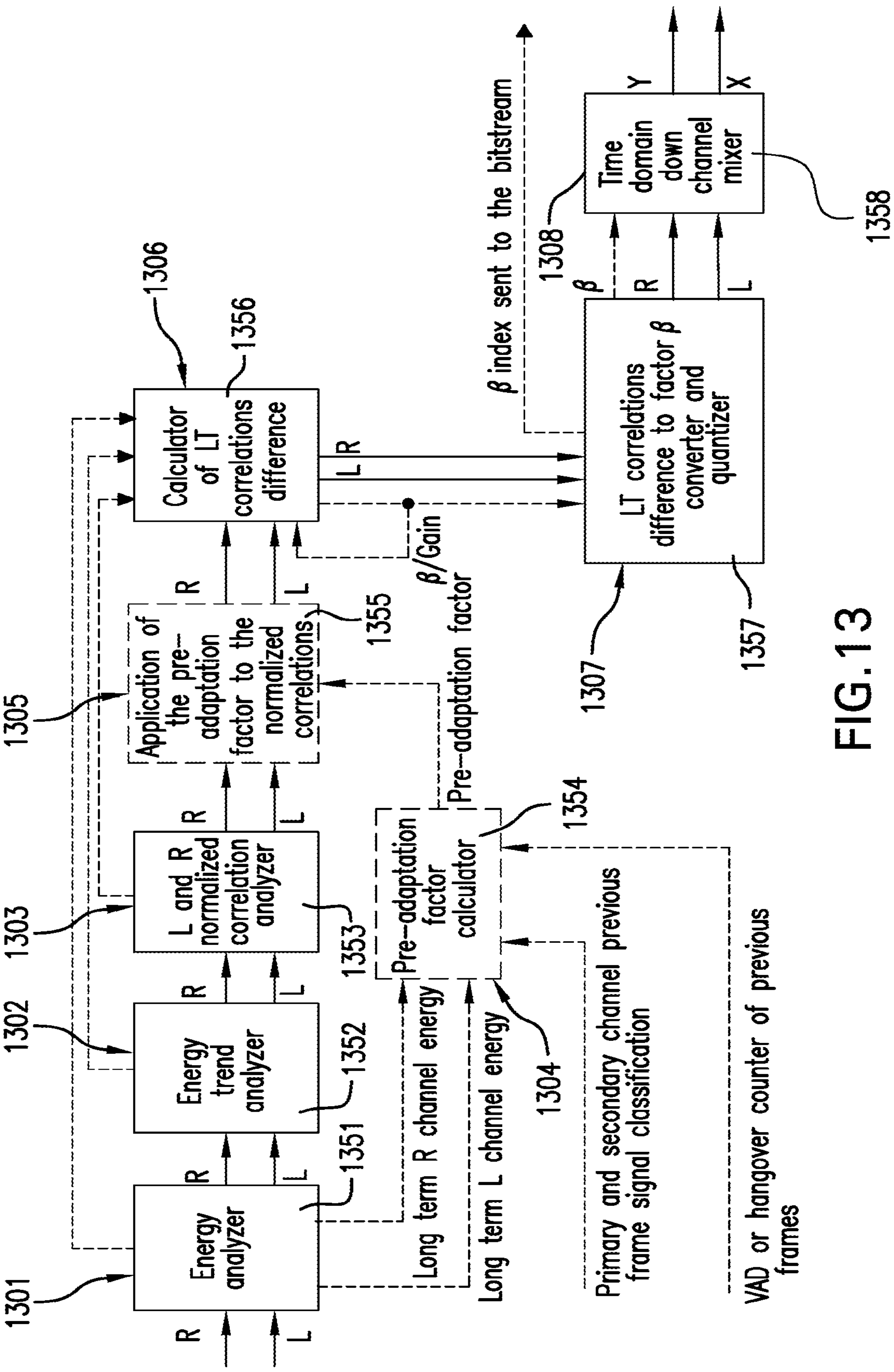
FIG. 13 is a block diagram illustrating concurrently other embodiments of sub-operations of the time domain down mixing operation of the stereo sound encoding method of FIGS. 2 and 3, and modules of the channel mixer of the stereo sound encoding system of FIGS. 2 and 3, using a pre-adaptation factor to enhance stereo image stability.

FIG. 13 is a block diagram showing concurrently other embodiments of sub-operations of the time domain down mixing operation 201/301 of the stereo sound encoding method of FIGS. 2 and 3, and modules of the channel mixer 251/351 of the stereo sound encoding system of FIGS. 2 and 3, using a pre-adaptation factor to enhance stereo image stability. In an alternative implementation as represented in FIG. 13, the time domain down mixing operation 201/301 comprises the following sub-operations: an energy analysis sub-operation 1301, an energy trend analysis sub-operation 1302, an L and R channel normalized correlation analysis sub-operation 1303, a pre-adaptation factor computation sub-operation 1304, an operation 1305 of applying the pre-adaptation factor to normalized correlations, a long-term (LT) correlation difference computation sub-operation 1306, a gain to factor β conversion and quantization sub-operation 1307, and a time domain down mixing sub-operation 1308.

The sub-operations 1301, 1302 and 1303 are respectively performed by an energy analyzer 1351, an energy trend analyzer 1352 and an L and R normalized correlation analyzer 1353, substantially in the same manner as explained in the foregoing description in relation to sub-operations 401, 402 and 403, and analyzers 451, 452 and 453 of FIG. 4.

To perform sub-operation 1305, the channel mixer 251/351 comprises a calculator 1355 for applying the pre-adaptation factor $a_r$ directly to the correlations $G_{L|R}$) ($G_L(t)$ and $G_R(t)$) from relations (4) such that their evolution is smoothed depending on the energy and the characteristics of both channels. If the energy of the signal is low or if it has some unvoiced characteristics, then the evolution of the correlation gain can be slower.

To carry out the pre-adaptation factor computation sub-operation 1304, the channel mixer 251/351 comprises a pre-adaptation factor calculator 1354, supplied with (a) the long term left and right channel energy values of relations (2) from the energy analyzer 1351, (b) frame classification of previous frames and (c) voice activity information of the previous frames. The pre-adaptation factor calculator 1354 computes the pre-adaptation factor $a_r$, which may be linearized between 0.1 and 1 depending on the minimum long term rms values $\overline{rms}_{L|R}$ of the left and right channels from analyzer 1351, using relation (6a):

$$a_r=\max(\min(M_a\cdot\min(\overline{rms}_L(t),\overline{rms}_R(t))+B_a,1),0.1), \tag{11a}$$

In an embodiment, coefficient $M_a$ may have the value of 0.0009 and coefficient $B_a$ the value of 0.16. In a variant, the pre-adaptation factor $a_r$ may be forced to 0.15, for example, if a previous classification of the two channels R and L is indicative of unvoiced characteristics and of an active signal. A voice activity detection (VAD) hangover flag may also be used to determine that a previous part of the content of a frame was an active segment.

The operation 1305 of applying the pre-adaptation factor $a_r$ to the normalized correlations $G_{L|R}$ ($G_L(t)$ and $G_R(t)$ from relations (4)) of the left L and right R channels is distinct from the operation 404 of FIG. 4. Instead of calculating long term (LT) smoothed normalized correlations by applying to the normalized correlations $G_{L|R}$ ($G_L(t)$ and $G_R(t)$) a factor $(1-\alpha)$, $\alpha$ being the above defined speed of convergence (Relations (5)), the calculator 1355 applies the pre-adaptation factor $a_r$ directly to the normalized correlations $G_{L|R}$ ($G_L(t)$ and $G_R(t)$) of the left L and right R channels using relation (11b):

$$\tau_L(t)=a_r\cdot G_L(t)+(1-a_r)\cdot\overline{G_L}(t) \text{ and } \tau_R(t)=a_r\cdot G_R(t)+(1-a_r)\cdot\overline{G_R}(t). \quad (11b)$$

The calculator 1355 outputs adapted correlation gains $\tau_{L|R}$ that are provided to a calculator of long-term (LT) correlation differences 1356. The operation of time domain down mixing 201/301 (FIGS. 2 and 3) comprises, in the implementation of FIG. 13, a long-term (LT) correlation difference calculating sub-operation 1306, a long-term correlation difference to factor β conversion and quantization sub-operation 1307 and a time domain down mixing sub-operation 1358 similar to the sub-operations 404, 405 and 406, respectively, of FIG. 4.

The operation of time domain down mixing 201/301 (FIGS. 2 and 3) comprises, in the implementation of FIG. 13, a long-term (LT) correlation difference calculating sub-operation 1306, a long-term correlation difference to factor β conversion and quantization sub-operation 1307 and a time domain down mixing sub-operation 1358 similar to the sub-operations 404, 405 and 406, respectively, of FIG. 4.

The sub-operations 1306, 1307 and 1308 are respectively performed by a calculator 1356, a converter and quantizer 1357 and time domain down mixer 1358, substantially in the same manner as explained in the foregoing description in relation to sub-operations 404, 405 and 406, and the calculator 454, converter and quantizer 455 and time domain down mixer 456.

Figure 5:
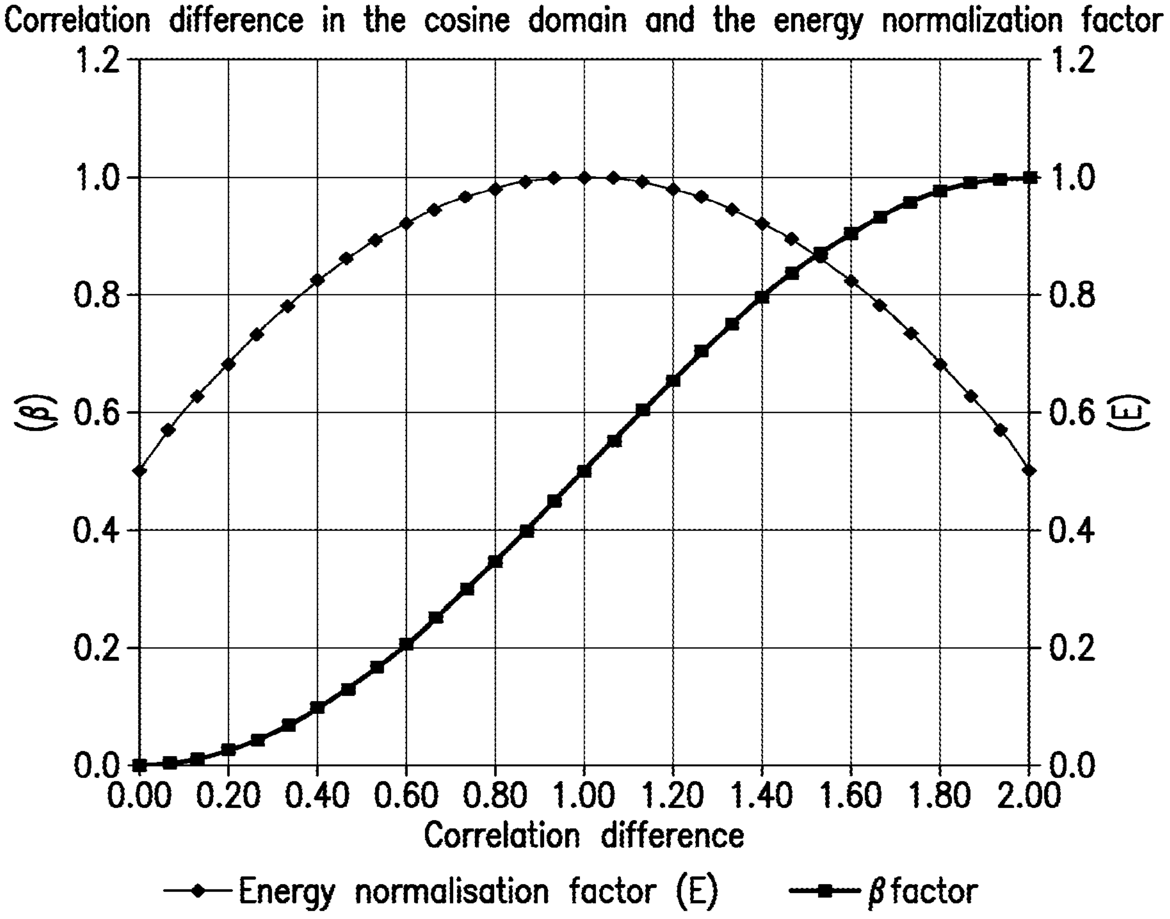
FIG. 5 is a graph showing how a linearized long-term correlation difference is mapped to a factor β and to an energy normalization factor ε.

FIG. 5 shows how the linearized long-term correlation difference $G_{LR}'(t)$ is mapped to the factor β and the energy scaling. It can be observed that for a linearized long-term correlation difference $G_{LR}'(t)$ of 1.0, meaning that the right R and left L channel energies/correlations are almost the same, the factor β is equal to 0.5 and an energy normalization (rescaling) factor ε is 1.0. In this situation, the content of the primary channel Y is basically a mono mixture and the secondary channel X forms a side channel. Calculation of the energy normalization (rescaling) factor ε is described hereinbelow.

On the other hand, if the linearized long-term correlation difference $G_{LR}'(t)$ is equal to 2, meaning that most of the energy is in the left channel L, then the factor β is 1 and the energy normalization (rescaling) factor is 0.5, indicating that the primary channel Y basically contains the left channel L in an integrated design implementation or a downscaled representation of the left channel L in an embedded design implementation. In this case, the secondary channel X contains the right channel R. In the example embodiments, the converter and quantizer 455 or 1357 quantizes the factor β using 31 possible quantization entries. The quantized version of the factor β is represented using a 5 bits index and, as described hereinabove, is supplied to the multiplexer for integration into the multiplexed bitstream 207/307, and transmitted to the decoder through the communication link.

In an embodiment, the factor β may also be used as an indicator for both the primary channel encoder 252/352 and the secondary channel encoder 253/353 to determine the bit-rate allocation. For example, if the β factor is close to 0.5, meaning that the two (2) input channel energies/correlation to the mono are close to each other, more bits would be allocated to the secondary channel X and less bits to the primary channel Y, except if the content of both channels is pretty close, then the content of the secondary channel will be really low energy and likely be considered as inactive, thus allowing very few bits to code it. On the other hand, if the factor β is closer to 0 or 1, then the bit-rate allocation will favor the primary channel Y.

Figure 6:
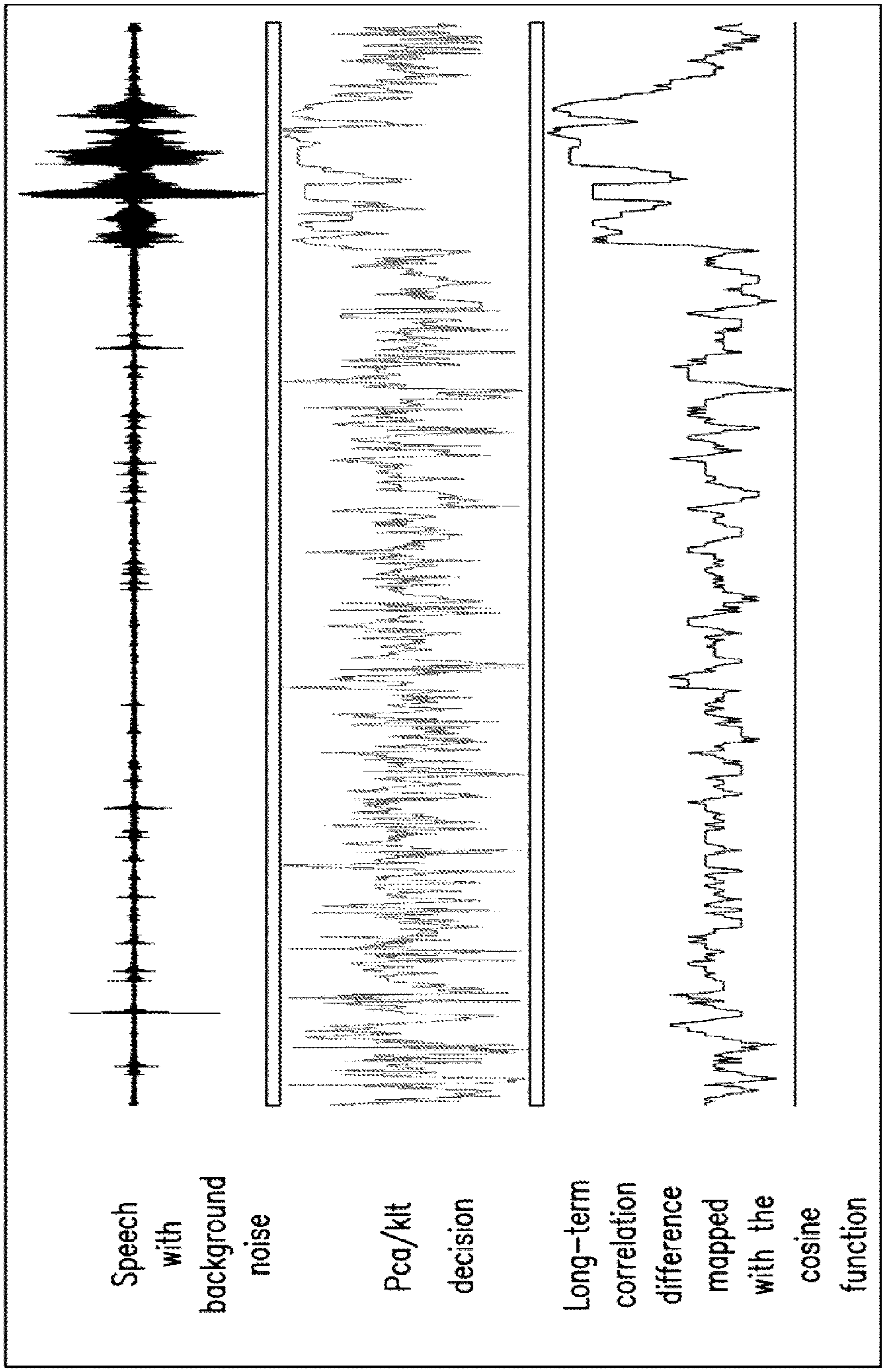
FIG. 6 is a multiple-curve graph showing a difference between using a pca/klt scheme over an entire frame and using a "cosine" mapping function.

FIG. 6 shows the difference between using the above mentioned pca/klt scheme over the entire frame (two top curves of FIG. 6) versus using the "cosine" function as developed in relation (8) to compute the factor β (bottom curve of FIG. 6). By nature the pca/klt scheme tends to search for a minimum or a maximum. This works well in case of active speech as shown by the middle curve of FIG. 6, but this does not work really well for speech with background noise as it tends to continuously switch from 0 to 1 as shown by the middle curve of FIG. 6. Too frequent switching to extremities, 0 and 1, causes lots of artefacts when coding at low bit-rate. A potential solution would have been to smooth out the decisions of the pca/klt scheme, but this would have negatively impacted the detection of speech bursts and their correct locations while the "cosine" function of relation (8) is more efficient in this respect.

Figure 7:
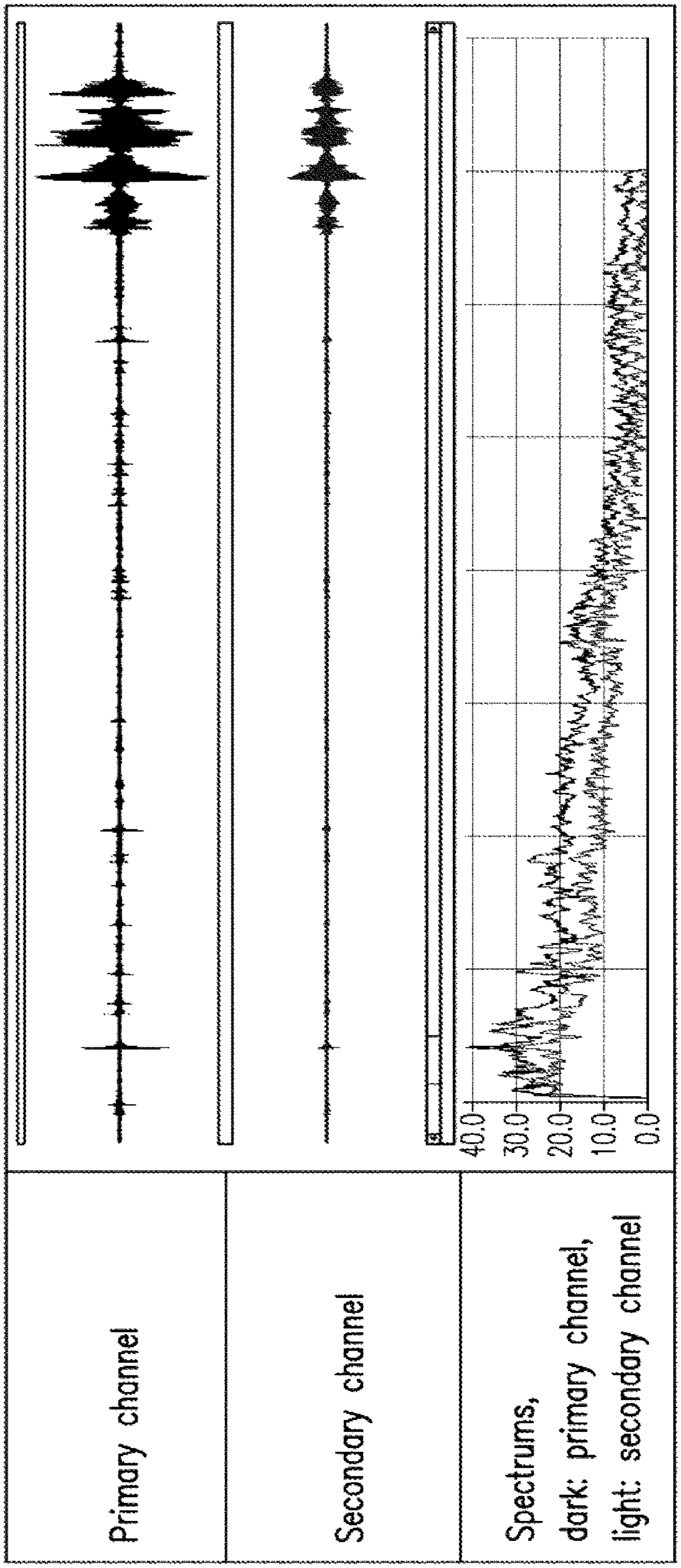
FIG. 7 is a multiple-curve graph showing a primary channel, a secondary channel and the spectrums of these primary and secondary channels resulting from applying time domain down mixing to a stereo sample that has been recorded in a small echoic room using a binaural microphones setup with office noise in background.

FIG. 7 shows the primary channel Y, the secondary channel X and the spectrums of these primary Y and secondary X channels resulting from applying time domain down mixing to a stereo sample that has been recorded in a small echoic room using a binaural microphones setup with office noise in background. After the time domain down mixing operation, it can be seen that both channels still have similar spectrum shapes and the secondary channel X still has a speech like temporal content, thus permitting to use a speech based model to encode the secondary channel X.

The time domain down mixing presented in the foregoing description may show some issues in the special case of right R and left L channels that are inverted in phase. Summing the right R and left L channels to obtain a monophonic signal would result in the right R and left L channels cancelling each other. To solve this possible issue, in an embodiment, channel mixer 251/351 compares the energy of the monophonic signal to the energy of both the right R and left L channels. The energy of the monophonic signal should be at least greater than the energy of one of the right R and left L channels. Otherwise, in this embodiment, the time domain down mixing model enters the inverted phase special case. In the presence of this special case, the factor β is forced to 1 and the secondary channel X is forcedly encoded using generic or unvoiced mode, thus preventing the inactive coding mode and ensuring proper encoding of the secondary channel X. This special case, where no energy rescaling is applied, is signaled to the decoder by using the last bits combination (index value) available for the transmission of the factor β (Basically since β is quantized using 5 bits and 31 entries (quantization levels) are used for quantization as described hereinabove, the $32^{th}$ possible bit combination (entry or index value) is used for signaling this special case).

In an alternative implementation, more emphasis may be put on the detection of signals that are suboptimal for the down mixing and coding techniques described hereinabove, such as in cases of out-of-phase or near out-of-phase signals. Once these signals are detected, the underlying coding techniques may be adapted if needed.

Typically, for time domain down mixing as described herein, when the left L and right R channels of an input stereo signal are out-of-phase, some cancellation may happen during the down mixing process, which could lead to a suboptimal quality. In the above examples, the detection of these signals is simple and the coding strategy comprises encoding both channels separately. But sometimes, with special signals, such as signals that are out-of-phase, it may be more efficient to still perform a down mixing similar to mono/side (β=0.5), where a greater emphasis is put on the side channel. Given that some special treatment of these signals may be beneficial, the detection of such signals needs to be performed carefully. Furthermore, transition from the normal time domain down mixing model as described in the foregoing description and the time domain down mixing model that is dealing with these special signals may be triggered in very low energy region or in regions where the pitch of both channels is not stable, such that the switching between the two models has a minimal subjective effect.

Temporal delay correction (TDC) (see temporal delay corrector 1750 in FIGS. 17 and 18) between the L and R channels, or a technique similar to what is described in reference [8], of which the full content is incorporated herein by reference, may be performed before entering into the down-mixing module 201/301, 251/351. In such an embodiment, the factor β may end-up having a different meaning from that which has been described hereinabove. For this type of implementation, at the condition that the temporal delay correction operates as expected, the factor β may become close to 0.5, meaning that the configuration of the time domain down mixing is close to a mono/side configuration. With proper operation of the temporal delay correction (TDC), the side may contain a signal including a smaller amount of important information. In that case, the bitrate of the secondary channel X may be minimum when the factor β is close to 0.5. On the other hand, if the factor β is close to 0 or 1, this means that the temporal delay correction (TDC) may not properly overcome the delay miss-alignment situation and the content of the secondary channel X is likely to be more complex, thus needing a higher bitrate. For both types of implementation, the factor β and by association the energy normalization (rescaling) factor ε, may be used to improve the bit allocation between the primary channel Y and the secondary channel X.

Figure 14:
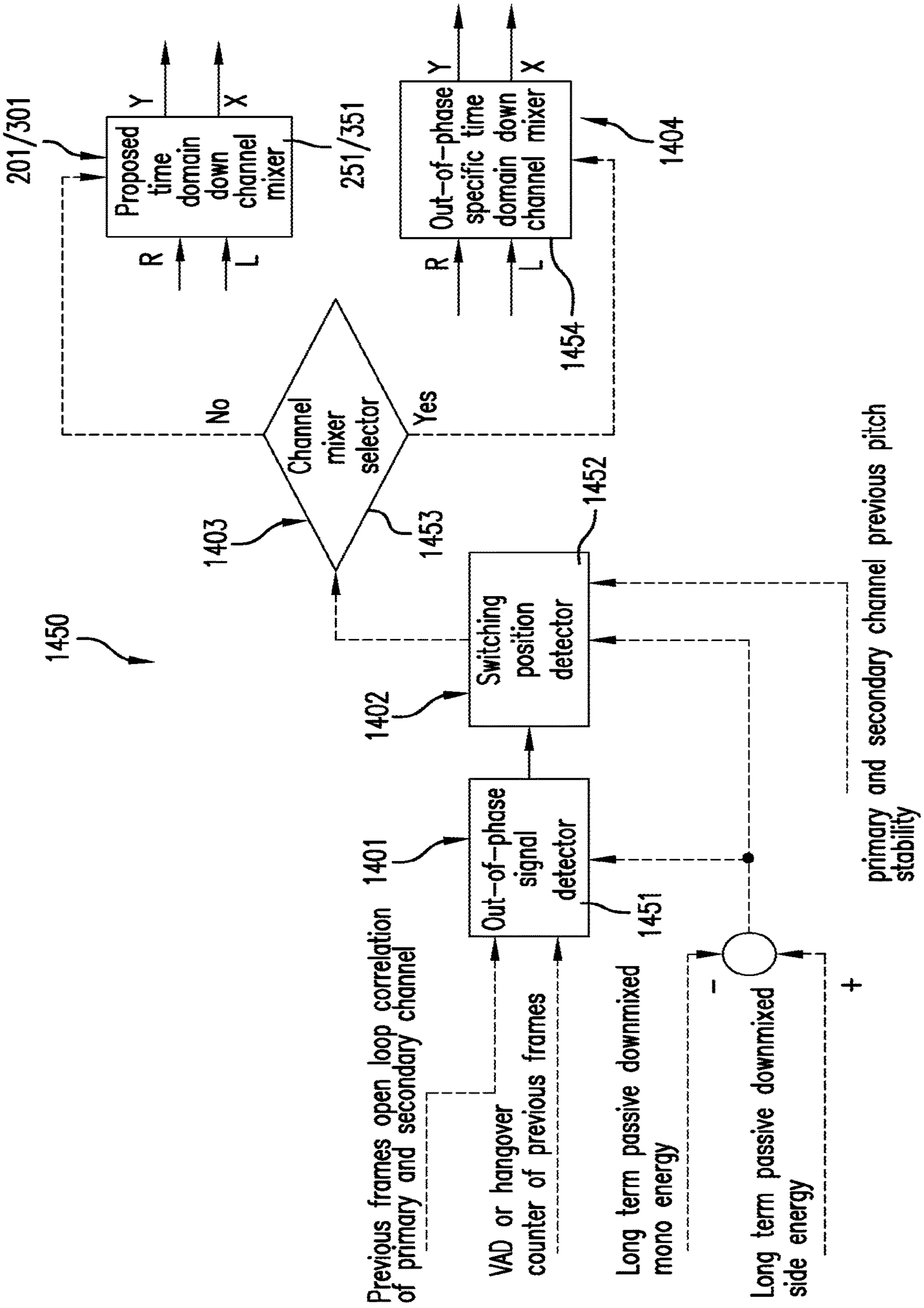
FIG. 14 is a block diagram illustrating concurrently operations of a temporal delay correction and modules of a temporal delay corrector.

FIG. 14 is a block diagram showing concurrently operations of an out-of-phase signal detection and modules of an out-of-phase signal detector 1450 forming part of the down-mixing operation 201/301 and channel mixer 251/351. The operations of the out-of-phase signal detection includes, as shown in FIG. 14, an out-of-phase signal detection operation 1401, a switching position detection operation 1402, and channel mixer selection operation 1403, to choose between the time-domain down mixing operation 201/301 and an out-of-phase specific time domain down mixing operation 1404. These operations are respectively performed by an out-of-phase signal detector 1451, a switching position detector 1452, a channel mixer selector 1453, the previously described time domain down channel mixer 251/351, and an out-of-phase specific time domain down channel mixer 1454.

The out-of-phase signal detection 1401 is based on an open loop correlation between the primary and secondary channels in previous frames. To this end, the detector 1451 computes in the previous frames an energy difference $S_m(t)$ between a side signal s(i) and a mono signal m(i) using relations (12a) and (12b):

$$S_m(t) = 10 \cdot \left( \log_{10}\left( \frac{\sqrt{\sum_{i=0}^{N-1} s(i)^2}}{N} \right) - \log_{10}\left( \frac{\sqrt{\sum_{i=0}^{N-1} m(i)^2}}{N} \right) \right), \tag{12a}$$

-continued $$m(i) = \left( \frac{L(i) + R(i)}{2} \right) \text{ and } s(i) = \left( \frac{L(i) - R(i)}{2} \right), \tag{12b}$$

Then, the detector 1451 computes the long term side to mono energy difference $\overline{S_m}(t)$ using relation (12c):

$$\overline{S_m}(t) = \begin{cases} 0.9 \cdot \overline{S_m}(t_{-1}), & \text{for inactive content,} \\ 0.9 \cdot \overline{S_m}(t_{-1}) + 0.1 \cdot S_m(t), & \text{otherwise} \end{cases} \tag{12c}$$

where t indicates the current frame, $t_{-1}$ the previous frame, and where inactive content may be derived from the Voice Activity Detector (VAD) hangover flag or from a VAD hangover counter.

In addition to the long term side to mono energy difference $\overline{S_m}(t)$, the last pitch open loop maximum correlation $C_{F|L}$ of each channel Y and X, as defined in clause 5.1.10 of Reference [1], is also taken into account to decide when the current model is considered as sub-optimal. $C_{P(t_{-1})}$ represents the pitch open loop maximum correlation of the primary channel Y in a previous frame and $C_{S\,(t_{-1})}$, the open pitch loop maximum correlation of the secondary channel X in the previous frame. A sub-optimality flag $F_{sub}$ is calculated by the switching position detector 1452 according to the following criteria:

If the long term side to mono energy difference $\overline{S_m}(t)$ is above a certain threshold, for example when $\overline{S_m}(t)>2.0$, if both the pitch open loop maximum correlations $C_{P(t_{-1})}$ and $C_{S\,(t_{-1})}$ are between 0.85 and 0.92, meaning the signals have a good correlation, but are not as correlated as a voiced signal would be, the sub-optimality flag $F_{sub}$ is set to 1, indicating an out-of-phase condition between the left L and right R channels.

Otherwise, the sub-optimality flag $F_{sub}$ is set to 0, indicating no out-of-phase condition between the left L and right R channels.

To add some stability in the sub-optimality flag decision, the switching position detector 1452 implements a criterion regarding the pitch contour of each channel Y and X. The switching position detector 1452 determines that the channel mixer 1454 will be used to code the sub-optimal signals when, in the example embodiment, at least three (3) consecutive instances of the sub-optimality flag $F_{sub}$ are set to 1 and the pitch stability of the last frame of one of the primary channel $p_{pc\,(t-1)}$, or of the secondary channel, $p_{sc(t-1)}$, is greater than 64. The pitch stability consists in the sum of the absolute differences of the three open loop pitches $p_{0|1|2}$ as defined in 5.1.10 of Reference [1], computed by the switching position detector 1452 using relation (12d):

$$p_{pc}=|p_1-p_0|+|p_2-p_1| \text{ and } p_{sc}=|p_1-p_0|+|p_2-p_1| \tag{12d}$$

The switching position detector 1452 provides the decision to the channel mixer selector 1453 that, in turn, selects the channel mixer 251/351 or the channel mixer 1454 accordingly. The channel mixer selector 1453 implements a hysteresis such that, when the channel mixer 1454 is selected, this decision holds until the following conditions are met: a number of consecutive frames, for example 20 frames, are considered as being optimal, the pitch stability of the last frame of one of the primary $p_{pc\,(t-1)}$ or the secondary channel $p_{sc(t-1)}$ is greater than a predetermined number, for example 64, and the long term side to mono energy difference $\overline{S_m}(t)$ is below or equal to 0.

2) Dynamic Encoding Between Primary and Secondary Channels

Figure 8:
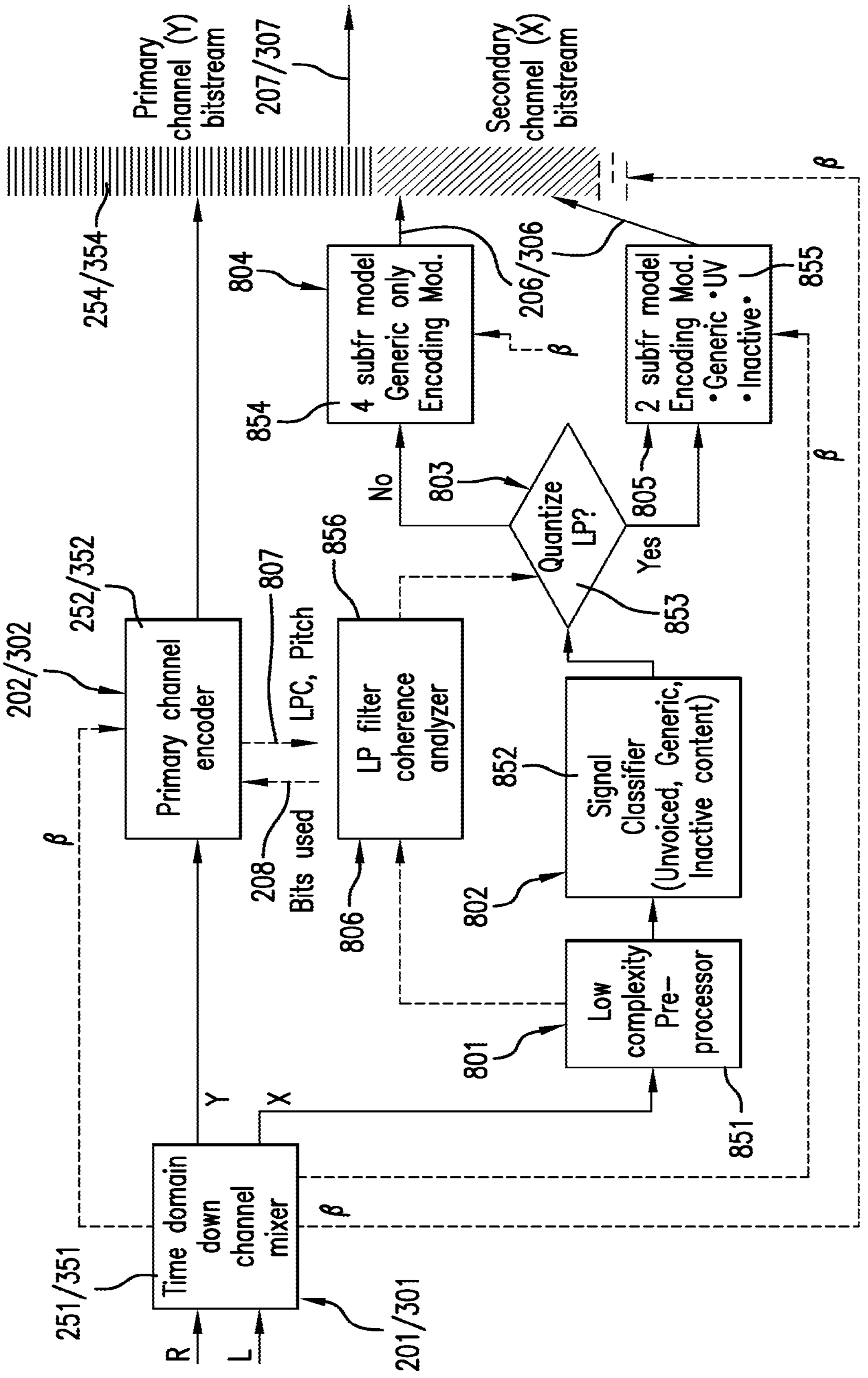
FIG. 8 is a block diagram illustrating concurrently a stereo sound encoding method and system, with a possible implementation of optimization of the encoding of both the primary Y and secondary X channels of the stereo sound signal.

FIG. 8 is a block diagram illustrating concurrently the stereo sound encoding method and system, with a possible implementation of optimization of the encoding of both the primary Y and secondary X channels of the stereo sound signal, such as speech or audio.

Referring to FIG. 8, the stereo sound encoding method comprises a low complexity pre-processing operation 801 implemented by a low complexity pre-processor 851, a signal classification operation 802 implemented by a signal classifier 852, a decision operation 803 implemented by a decision module 853, a four (4) subframes model generic only encoding operation 804 implemented by a four (4) subframes model generic only encoding module 854, a two (2) subframes model encoding operation 805 implemented by a two (2) subframes model encoding module 855, and an LP filter coherence analysis operation 806 implemented by an LP filter coherence analyzer 856.

After time-domain down mixing 301 has been performed by the channel mixer 351, in the case of the embedded model, the primary channel Y is encoded (primary channel encoding operation 302) (a) using as the primary channel encoder 352 a legacy encoder such as the legacy EVS encoder or any other suitable legacy sound encoder (It should be kept in mind that, as mentioned in the foregoing description, any suitable type of encoder can be used as the primary channel encoder 352). In the case of an integrated structure, a dedicated speech codec is used as primary channel encoder 252. The dedicated speech encoder 252 may be a variable bit-rate (VBR) based encoder, for example a modified version of the legacy EVS encoder, which has been modified to have a greater bitrate scalability that permits the handling of a variable bitrate on a per frame level (Again it should be kept in mind that, as mentioned in the foregoing description, any suitable type of encoder can be used as the primary channel encoder 252). This allows that the minimum amount of bits used for encoding the secondary channel X to vary in each frame and be adapted to the characteristics of the sound signal to be encoded. At the end, the signature of the secondary channel X will be as homogeneous as possible.

Encoding of the secondary channel X, i.e. the lower energy/correlation to mono input, is optimized to use a minimal bit-rate, in particular but not exclusively for speech like content. For that purpose, the secondary channel encoding can take advantage of parameters that are already encoded in the primary channel Y, such as the LP filter coefficients (LPC) and/or pitch lag 807. Specifically, it will be decided, as described hereinafter, if the parameters calculated during the primary channel encoding are sufficiently close to corresponding parameters calculated during the secondary channel encoding to be re-used during the secondary channel encoding.

First, the low complexity pre-processing operation 801 is applied to the secondary channel X using the low complexity pre-processor 851, wherein a LP filter, a voice activity detection (VAD) and an open loop pitch are computed in response to the secondary channel X. The latter calculations may be implemented, for example, by those performed in the EVS legacy encoder and described respectively in clauses 5.1.9, 5.1.12 and 5.1.10 of Reference [1] of which, as indicated hereinabove, the full contents is herein incorporated by reference. Since, as mentioned in the foregoing description, any suitable type of encoder may be used as the primary channel encoder 252/352, the above calculations may be implemented by those performed in such a primary channel encoder.

Then, the characteristics of the secondary channel X signal are analyzed by the signal classifier 852 to classify the secondary channel X as unvoiced, generic or inactive using techniques similar to those of the EVS signal classification function, clause 5.1.13 of the same Reference [1]. These operations are known to those of ordinary skill in the art and can been extracted from Standard 3GPP TS 26.445, v. 12.0.0 for simplicity, but alternative implementations can be used as well.

a. Reusing the Primary Channel LP Filter Coefficients

An important part of bit-rate consumption resides in the quantization of the LP filter coefficients (LPC). At low bit-rate, full quantization of the LP filter coefficients can take up to nearly 25% of the bit budget. Given that the secondary channel X is often close in frequency content to the primary channel Y, but with lowest energy level, it is worth verifying if it would be possible to reuse the LP filter coefficients of the primary channel Y. To do so, as shown in FIG. 8, an LP filter coherence analysis operation 806 implemented by an LP filter coherence analyzer 856 has been developed, in which few parameters are computed and compared to validate the possibility to re-use or not the LP filter coefficients (LPC) 807 of the primary channel Y.

Figure 9:
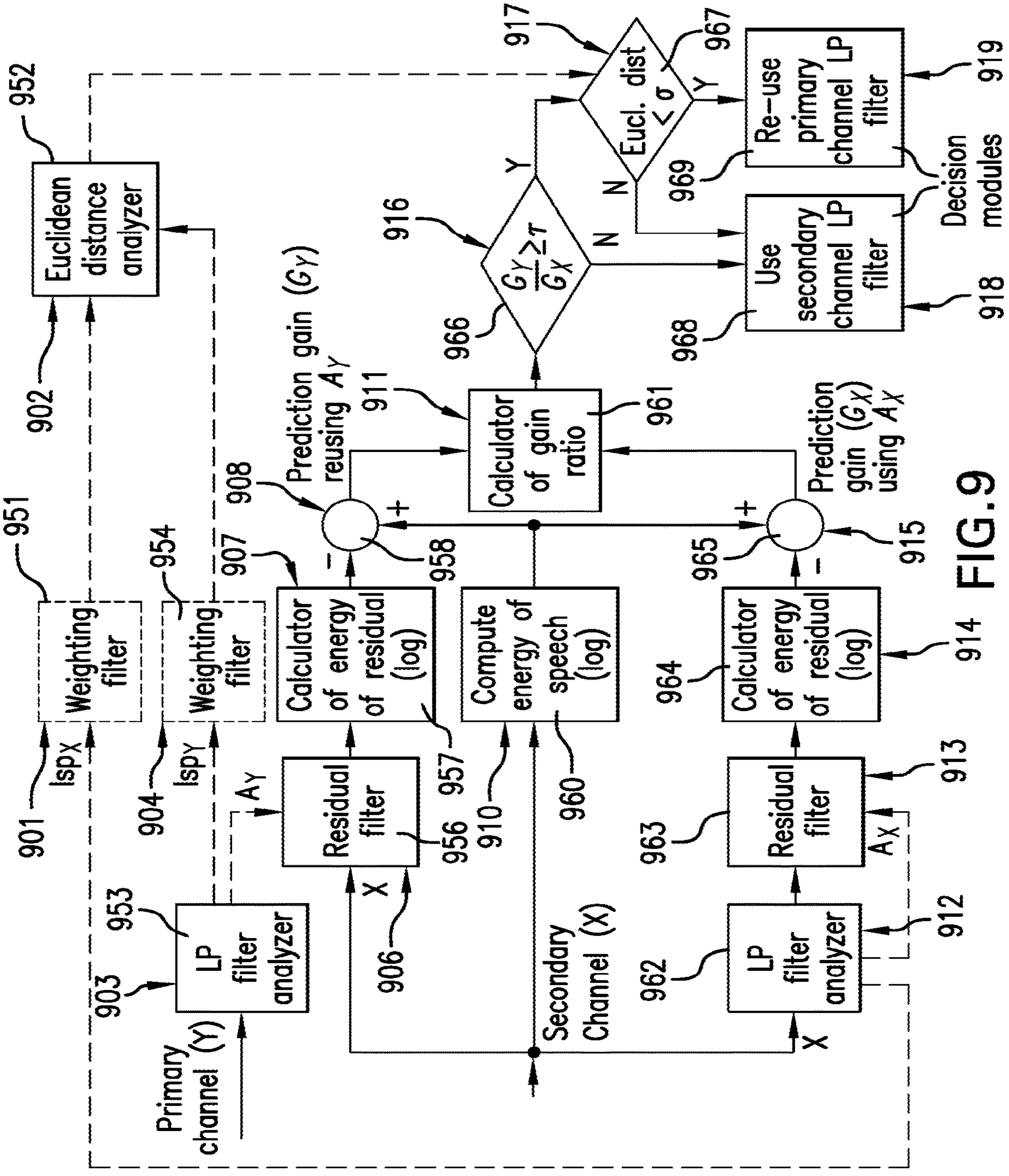
FIG. 9 is a block diagram illustrating an LP filter coherence analysis operation and corresponding LP filter coherence analyzer of the stereo sound encoding method and system of FIG. 8.

FIG. 9 is a block diagram illustrating the LP filter coherence analysis operation 806 and the corresponding LP filter coherence analyzer 856 of the stereo sound encoding method and system of FIG. 8.

The LP filter coherence analysis operation 806 and corresponding LP filter coherence analyzer 856 of the stereo sound encoding method and system of FIG. 8 comprise, as illustrated in FIG. 9, a primary channel LP (Linear Prediction) filter analysis sub-operation 903 implemented by an LP filter analyzer 953, a weighing sub-operation 904 implemented by a weighting filter 954, a secondary channel LP filter analysis sub-operation 912 implemented by an LP filter analyzer 962, a weighing sub-operation 901 implemented by a weighting filter 951, an Euclidean distance analysis sub-operation 902 implemented by an Euclidean distance analyzer 952, a residual filtering sub-operation 913 implemented by a residual filter 963, a residual energy calculation sub-operation 914 implemented by a calculator 964 of energy of residual, a subtraction sub-operation 915 implemented by a subtractor 965, a sound (such as speech and/or audio) energy calculation sub-operation 910 implemented by a calculator 960 of energy, a secondary channel residual filtering operation 906 implemented by a secondary channel residual filter 956, a residual energy calculation sub-operation 907 implemented by a calculator of energy of residual 957, a subtraction sub-operation 908 implemented by a subtractor 958, a gain ratio calculation sub-operation 911 implemented by a calculator of gain ratio, a comparison sub-operation 916 implemented by a comparator 966, a comparison sub-operation 917 implemented by a comparator 967, a secondary channel LP filter use decision sub-operation 918 implemented by a decision module 968, and a primary channel LP filter re-use decision sub-operation 919 implemented by a decision module 969.

Referring to FIG. 9, the LP filter analyzer 953 performs an LP filter analysis on the primary channel Y while the LP filter analyzer 962 performs an LP filter analysis on the secondary channel X. The LP filter analysis performed on each of the primary Y and secondary X channels is similar to the analysis described in clause 5.1.9 of Reference [1].

Then, the LP filter coefficients $A_y$ from the LP filter analyzer 953 are supplied to the residual filter 956 for a first residual filtering, $r_Y$, of the secondary channel X. In the same manner, the optimal LP filter coefficients $A_x$ from the LP filter analyzer 962 are supplied to the residual filter 963 for a second residual filtering, $r_X$, of the secondary channel X. The residual filtering with either filter coefficients, $A_Y$ or $A_X$, is performed as using relation (11):

$$r_{Y|X}(n)=s_X(n)+\Sigma_{i=0}^{16}(A_{Y|X}(i)\cdot s_X(n-i)),n=0, \ldots ,N-1 \quad (13)$$

where, in this example, $s_x$ represents the secondary channel, the LP filter order is 16, and N is the number of samples in the frame (frame size) which is usually 256 corresponding a 20 ms frame duration at a sampling rate of 12.8 kHz.

The calculator 910 computes the energy $E_x$ of the sound signal in the secondary channel X using relation (14):

$$E_x=10\cdot\log_{10}(\Sigma_{i=0}^{N-1}s_x(i)^2), \quad (14)$$

and the calculator 957 computes the energy $E_{ry}$ of the residual from the residual filter 956 using relation (15):

$$E_{ry}=10\cdot\log_{10}(\Sigma_{i=0}^{N-1}r_y(i)^2). \quad (15)$$

The subtractor 958 subtracts the residual energy from calculator 957 from the sound energy from calculator 960 to produce a prediction gain $G_y$.

In the same manner, the calculator 964 computes the energy $E_{rx}$, of the residual from the residual filter 963 using relation (16):

$$E_{rx}=10\cdot\log_{10}(\Sigma_{i=0}^{N-1}r_x(i)^2, \quad (16)$$

and the subtractor 965 subtracts this residual energy from the sound energy from calculator 960 to produce a prediction gain $G_X$.

The calculator 961 computes the gain ratio $G_Y/G_X$. The comparator 966 compares the gain ratio $G_Y/G_X$ to a threshold $\tau$, which is 0.92 in the example embodiment. If the ratio $G_Y/G_X$ is smaller than the threshold $\tau$, the result of the comparison is transmitted to decision module 968 which forces use of the secondary channel LP filter coefficients for encoding the secondary channel X.

The Euclidean distance analyzer 952 performs an LP filter similarity measure, such as the Euclidean distance between the line spectral pairs $lsp_Y$ computed by the LP filter analyzer 953 in response to the primary channel Y and the line spectral pairs $lsp_X$ computed by the LP filter analyzer 962 in response to the secondary channel X. As known to those of ordinary skill in the art, the line spectral pairs $lsp_Y$ and $lsp_X$ represent the LP filter coefficients in a quantization domain. The analyzer 952 uses relation (17) to determine the Euclidean distance dist:

$$dist = \sum_{i=0}^{M-1} (lsp_Y(i) - lsp_X(i))^2 \quad (17)$$

where M represents the filter order, and $lsp_Y$ and $lsp_X$ represent respectively the line spectral pairs computed for the primary Y and the secondary X channels.

Before computing the Euclidean distance in analyzer 952, it is possible to weight both sets of line spectral pairs $lsp_Y$ and $lsp_X$ through respective weighting factors such that more or less emphasis is put on certain portions of the spectrum. Other LP filter representations can be also used to compute the LP filter similarity measure.

Once the Euclidian distance dist is known, it is compared to a threshold $\sigma$ in comparator 967. In the example embodiment, the threshold $\sigma$ has a value of 0.08. When the comparator 966 determines that the ratio $G_Y/G_X$ is equal to or larger than the threshold $\tau$ and the comparator 967 determines that the Euclidian distance dist is equal to or larger than the threshold $\sigma$, the result of the comparisons is transmitted to decision module 968 which forces use of the secondary channel LP filter coefficients for encoding the secondary channel X. When the comparator 966 determines that the ratio $G_Y/G_X$ is equal to or larger than the threshold $\tau$ and the comparator 967 determines that the Euclidian distance dist is smaller than the threshold $\sigma$, the result of these comparisons is transmitted to decision module 969 which forces re-use of the primary channel LP filter coefficients for encoding the secondary channel X. In the latter case, the primary channel LP filter coefficients are re-used as part of the secondary channel encoding.

Some additional tests can be conducted to limit re-usage of the primary channel LP filter coefficients for encoding the secondary channel X in particular cases, for example in the case of unvoiced coding mode, where the signal is sufficiently easy to encode that there is still bit-rate available to encode the LP filter coefficients as well. It is also possible to force re-use of the primary channel LP filter coefficients when a very low residual gain is already obtained with the secondary channel LP filter coefficients or when the secondary channel X has a very low energy level. Finally, the variables $\tau$, $\sigma$, the residual gain level or the very low energy level at which the reuse of the LP filter coefficients can be forced can all be adapted as a function of the bit budget available and/or as a function of the content type. For example, if the content of the secondary channel is considered as inactive, then even if the energy is high, it may be decided to reuse the primary channel LP filter coefficients.

b. Low Bit-Rate Encoding of Secondary Channel

Since the primary Y and secondary X channels may be a mix of both the right R and left L input channels, this implies that, even if the energy content of the secondary channel X is low compared to the energy content of the primary channel Y, a coding artefact may be perceived once the up-mix of the channels is performed. To limit such possible artefact, the coding signature of the secondary channel X is kept as constant as possible to limit any unintended energy variation. As shown in FIG. 7, the content of the secondary channel X has similar characteristics to the content of the primary channel Y and for that reason a very low bit-rate speech like coding model has been developed.

Referring back to FIG. 8, the LP filter coherence analyzer 856 sends to the decision module 853 the decision to re-use the primary channel LP filter coefficients from decision module 969 or the decision to use the secondary channel LP filter coefficients from decision module 968. Decision module 803 then decides not to quantize the secondary channel LP filter coefficients when the primary channel LP filter coefficients are re-used and to quantize the secondary channel LP filter coefficients when the decision is to use the secondary channel LP filter coefficients. In the latter case, the quantized secondary channel LP filter coefficients are sent to the multiplexer 254/354 for inclusion in the multiplexed bitstream 207/307.

In the four (4) subframes model generic only encoding operation 804 and the corresponding four (4) subframes model generic only encoding module 854, to keep the bit-rate as low as possible, an ACELP search as described in clause 5.2.3.1 of Reference [1] is used only when the LP filter coefficients from the primary channel Y can be re-used, when the secondary channel X is classified as generic by signal classifier 852, and when the energy of the input right R and left L channels is close to the center, meaning that the energies of both the right R and left L channels are close to each other. The coding parameters found during the ACELP search in the four (4) subframes model generic only encoding module 854 are then used to construct the secondary channel bitstream 206/306 and sent to the multiplexer 254/354 for inclusion in the multiplexed bitstream 207/307.

Otherwise, in the two (2) subframes model encoding operation 805 and the corresponding two (2) subframes model encoding module 855, a half-band model is used to encode the secondary channel X with generic content when the LP filter coefficients from the primary channel Y cannot be re-used. For the inactive and unvoiced content, only the spectrum shape is coded.

In encoding module 855, inactive content encoding comprises (a) frequency domain spectral band gain coding plus noise filling and (b) coding of the secondary channel LP filter coefficients when needed as described respectively in (a) clauses 5.2.3.5.7 and 5.2.3.5.11 and (b) clause 5.2.2.1 of Reference [1]. Inactive content can be encoded at a bit-rate as low as 1.5 kb/s.

In encoding module 855, the secondary channel X unvoiced encoding is similar to the secondary channel X inactive encoding, with the exception that the unvoiced encoding uses an additional number of bits for the quantization of the secondary channel LP filter coefficients which are encoded for unvoiced secondary channel.

The half-band generic coding model is constructed similarly to ACELP as described in clause 5.2.3.1 of Reference [1], but it is used with only two (2) sub-frames by frame. Thus, to do so, the residual as described in clause 5.2.3.1.1 of Reference [1], the memory of the adaptive codebook as described in clause 5.2.3.1.4 of Reference [1] and the input secondary channel are first down-sampled by a factor 2. The LP filter coefficients are also modified to represent the down-sampled domain instead of the 12.8 kHz sampling frequency using a technique as described in clause 5.4.4.2 of Reference [1].

After the ACELP search, a bandwidth extension is performed in the frequency domain of the excitation. The bandwidth extension first replicates the lower spectral band energies into the higher band. To replicate the spectral band energies, the energy of the first nine (9) spectral bands, $G_{bd}(i)$, are found as described in clause 5.2.3.5.7 of Reference [1] and the last bands are filled as shown in relation (18):

$$G_{bd}(i)=G_{bd}(16-i-1),\ \text{for } i=8, \ldots, 15. \tag{18}$$

Then, the high frequency content of the excitation vector represented in the frequency domain $f_d(k)$ as described in clause 5.2.3.5.9 of Reference [1] is populated using the lower band frequency content using relation (19):

$$f_d(k)=f_d(k-P_b),\ \text{for } k=128, \ldots, 255, \tag{19}$$

where the pitch offset, $P_b$, is based on a multiple of the pitch information as described in clause 5.2.3.1.4.1 of Reference [1] and is converted into an offset of frequency bins as shown in relation (20):

$$P_b = \begin{cases} \dfrac{8\cdot\left(\dfrac{F_s}{\overline{T}}\right)}{F_r}, & \overline{T} > 64 \\ \dfrac{4\cdot\left(\dfrac{F_s}{\overline{T}}\right)}{F_r} & \overline{T} \le 64 \end{cases}, \tag{20}$$

where $\overline{T}$ represents an average of the decoded pitch information per subframe, $F_s$ is the internal sampling frequency, 12.8 kHz in this example embodiment, and $F_r$ is the frequency resolution.

The coding parameters found during the low-rate inactive encoding, the low rate unvoiced encoding or the half-band generic encoding performed in the two (2) subframes model encoding module 855 are then used to construct the secondary channel bitstream 206/306 sent to the multiplexer 254/354 for inclusion in the multiplexed bitstream 207/307.

c. Alternative Implementation of the Secondary Channel Low Bit-Rate Encoding

Encoding of the secondary channel X may be achieved differently, with the same goal of using a minimal number of bits while achieving the best possible quality and while keeping a constant signature. Encoding of the secondary channel X may be driven in part by the available bit budget, independently from the potential re-use of the LP filter coefficients and the pitch information. Also, the two (2) subframes model encoding (operation 805) may either be half band or full band. In this alternative implementation of the secondary channel low bit-rate encoding, the LP filter coefficients and/or the pitch information of the primary channel can be re-used and the two (2) subframes model encoding can be chosen based on the bit budget available for encoding the secondary channel X. Also, the 2 subframes model encoding presented below has been created by doubling the subframe length instead of down-sampling/up-sampling its input/output parameters.

Figure 15:
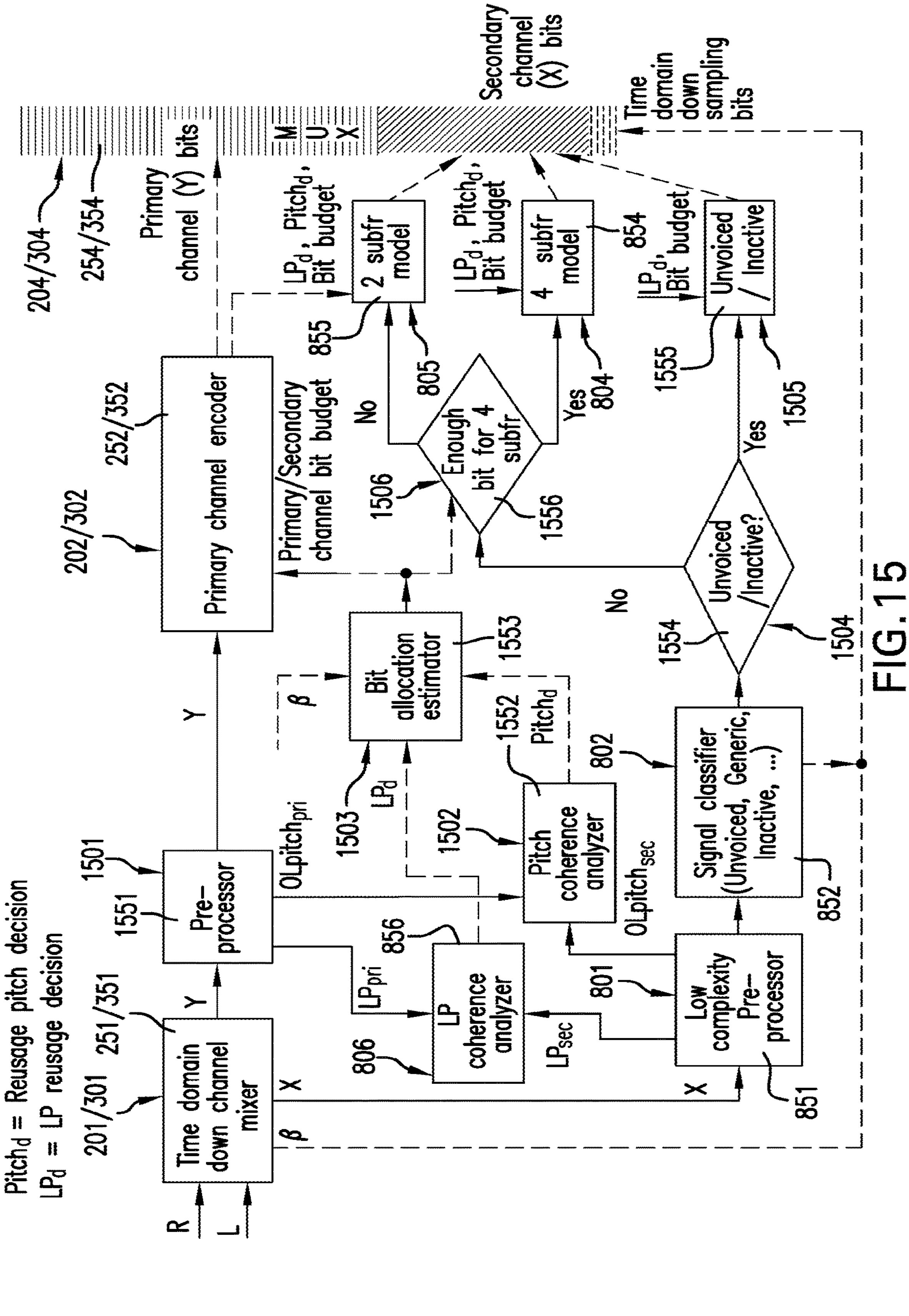
FIG. 15 is a block diagram illustrating concurrently an alternative stereo sound encoding method and system.

FIG. 15 is a block diagram illustrating concurrently an alternative stereo sound encoding method and an alternative stereo sound encoding system. The stereo sound encoding method and system of FIG. 15 include several of the operations and modules of the method and system of FIG. 8, identified using the same reference numerals and whose description is not repeated herein for brevity. In addition, the stereo sound encoding method of FIG. 15 comprises a pre-processing operation 1501 applied to the primary channel Y before its encoding at operation 202/302, a pitch coherence analysis operation 1502, an unvoiced/inactive decision operation 1504, an unvoiced/inactive coding decision operation 1505, and a 2/4 subframes model decision operation 1506.

The sub-operations 1501, 1502, 1503, 1504, 1505 and 1506 are respectively performed by a pre-processor 1551 similar to low complexity pre-processor 851, a pitch coherence analyzer 1552, a bit allocation estimator 1553, a unvoiced/inactive decision module 1554, an unvoiced/inactive encoding decision module 1555 and a 2/4 subframes model decision module 1556.

Figure 16:
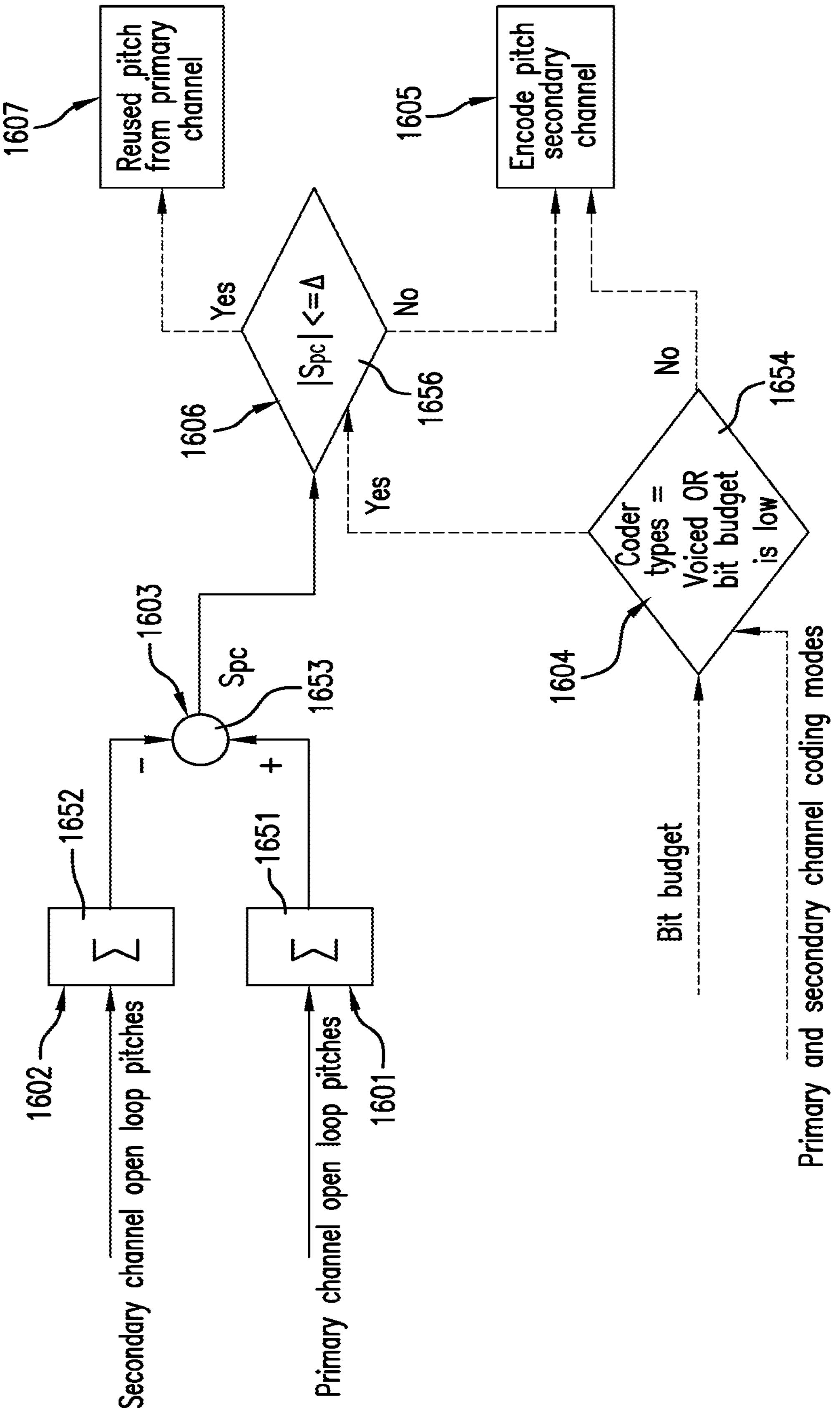
FIG. 16 is a block diagram illustrating concurrently sub-operations of a pitch coherence analysis and modules of a pitch coherence analyzer.

To perform the pitch coherence analysis operation 1502, the pitch coherence analyzer 1552 is supplied by the pre-processors 851 and 1551 with open loop pitches of both the primary Y and secondary X channels, respectively $OLpitch_{pri}$ and $OLpitch_{sec}$. The pitch coherence analyzer 1552 of FIG. 15 is shown in greater details in FIG. 16, which is a block diagram illustrating concurrently sub-operations of the pitch coherence analysis operation 1502 and modules of the pitch coherence analyzer 1552.

The pitch coherence analysis operation 1502 performs an evaluation of the similarity of the open loop pitches between the primary channel Y and the secondary channel X to decide in what circumstances the primary open loop pitch can be re-used in coding the secondary channel X. To this end, the pitch coherence analysis operation 1502 comprises a primary channel open loop pitches summation sub-operation 1601 performed by a primary channel open loop pitches adder 1651, and a secondary channel open loop pitches summation sub-operation 1602 performed by a secondary channel open loop pitches adder 1652. The summation from adder 1652 is subtracted (sub-operation 1603) from the summation from adder 1651 using a subtractor 1653. The result of the subtraction from sub-operation 1603 provides a stereo pitch coherence. As an non-limitative example, the summations in sub-operations 1601 and 1602 are based on three (3) previous, consecutive open loop pitches available for each channel Y and X. The open loop pitches can be computed, for example, as defined in clause 5.1.10 of Reference [1]. The stereo pitch coherence $S_{pc}$ is computed in sub-operations 1601, 1602 and 1603 using relation (21):

$$S_{pc}=|\Sigma_{i=0}{}^{2}p_{p(i)}-\Sigma_{i=0}{}^{2}p_{s(i)}| \tag{21}$$

where $p_{p|s\ (i)}$ represent the open loop pitches of the primary Y and secondary X channels and i represents the position of the open loop pitches.

When the stereo pitch coherence is below a predetermined threshold Δ, re-use of the pitch information from the primary channel Y may be allowed depending of an available bit budget to encode the secondary channel X. Also, depending of the available bit budget, it is possible to limit re-use of the pitch information for signals that have a voiced characteristic for both the primary Y and secondary X channels.

To this end, the pitch coherence analysis operation 1502 comprises a decision sub-operation 1604 performed by a decision module 1654 which consider the available bit budget and the characteristics of the sound signal (indicated for example by the primary and secondary channel coding modes). When the decision module 1654 detects that the available bit budget is sufficient or the sound signals for both the primary Y and secondary X channels have no voiced characteristic, the decision is to encode the pitch information related to the secondary channel X (1605).

When the decision module 1654 detects that the available bit budget is low for the purpose of encoding the pitch information of the secondary channel X or the sound signals for both the primary Y and secondary X channels have a voiced characteristic, the decision module compares the stereo pitch coherence $S_{pc}$ to the threshold Δ. When the bit budget is low, the threshold Δ is set to a larger value compared to the case where the bit budget more important (sufficient to encode the pitch information of the secondary channel X). When the absolute value of the stereo pitch coherence $S_{pc}$ is smaller than or equal to the threshold Δ, the module 1654 decides to re-use the pitch information from the primary channel Y to encode the secondary channel X (1607). When the value of the stereo pitch coherence $S_{pc}$ is higher than the threshold Δ, the module 1654 decides to encode the pitch information of the secondary channel X (1605).

Ensuring the channels have voiced characteristics increases the likelihood of a smooth pitch evolution, thus reducing the risk of adding artefacts by re-using the pitch of the primary channel. As a non-limitative example, when the stereo bit budget is below 14 kb/s and the stereo pitch coherence $S_{pc}$ is below or equal to a 6 (Δ=6), the primary pitch information can be re-used in encoding the secondary channel X. According to another non-limitative example, if the stereo bit budget is above 14 kb/s and below 26 kb/s, then both the primary Y and secondary X channels are considered as voiced and the stereo pitch coherence $S_{pc}$ is compared to a lower threshold Δ=3, which leads to a smaller re-use rate of the pitch information of the primary channel Y at a bit-rate of 22 kb/s.

Referring back to FIG. 15, the bit allocation estimator 1553 is supplied with the factor β from the channel mixer 251/351, with the decision to re-use the primary channel LP filter coefficients or to use and encode the secondary channel LP filter coefficients from the LP filter coherence analyzer 856, and with the pitch information determined by the pitch coherence analyzer 1552. Depending on primary and secondary channel encoding requirements, the bit allocation estimator 1553 provides a bit budget for encoding the primary channel Y to the primary channel encoder 252/352 and a bit budget for encoding the secondary channel X to the decision module 1556. In one possible implementation, for all content that is not INACTIVE, a fraction of the total bit-rate is allocated to the secondary channel. Then, the secondary channel bit-rate will be increased by an amount which is related to an energy normalization (rescaling) factor ε described previously as:

$$B_x=B_M+(0.25\cdot\varepsilon-0.125)\cdot(B_t-2\cdot B_M) \tag{21a}$$

where $B_x$ represents the bit-rate allocated to the secondary channel X, $B_t$ represents the total stereo bit-rate available, $B_M$ represents the minimum bit-rate allocated to the secondary channel and is usually around 20% of the total stereo bitrate. Finally, ε represents the above described energy normalization factor. Hence, the bit-rate allocated to the primary channel corresponds to the difference between the total stereo bit-rate and the secondary channel stereo bit-rate. In an alternative implementation the secondary channel bit-rate allocation can be described as:

$$B_x = \begin{cases} B_M + ((15-\varepsilon_{idx})\cdot(B_t-2\cdot B_M))\cdot 0.05, & \text{if } \varepsilon_{idx} < 15 \\ B_M + ((\varepsilon_{idx}-15)\cdot(B_t-2\cdot B_M))\cdot 0.05, & \text{if } \varepsilon_{idx} \geq 15 \end{cases} \tag{21b}$$

where again $B_x$ represents the bit-rate allocated to the secondary channel X, $B_t$ represents the total stereo bit-rate available and $B_M$ represents the minimum bit-rate allocated to the secondary channel. Finally, $\varepsilon_{idx}$ represents a transmitted index of the energy normalization factor. Hence, the bit-rate allocated to the primary channel corresponds to the difference between the total stereo bit-rate and the secondary channel bit-rate. In all cases, for INACTIVE content, the secondary channel bit-rate is set to the minimum bit-rate needed to encode the spectral shape of the secondary channel giving a bitrate usually close to 2 kb/s.

Meanwhile, the signal classifier 852 provides a signal classification of the secondary channel X to the decision module 1554. If the decision module 1554 determines that the sound signal is inactive or unvoiced, the unvoiced/inactive encoding module 1555 provides the spectral shape of the secondary channel X to the multiplexer 254/354. Alternatively, the decision module 1554 informs the decision module 1556 when the sound signal is neither inactive nor unvoiced. For such sound signals, using the bit budget for encoding the secondary channel X, the decision module 1556 determines whether there is a sufficient number of available bits for encoding the secondary channel X using the four (4) subframes model generic only encoding module 854; otherwise the decision module 1556 selects to encode the secondary channel X using the two (2) subframes model encoding module 855. To choose the four subframes model generic only encoding module, the bit budget available for the secondary channel must be high enough to allocate at least 40 bits to the algebraic codebooks, once everything else is quantized or reused, including the LP coefficient and the pitch information and gains.

As will be understood from the above description, in the four (4) subframes model generic only encoding operation 804 and the corresponding four (4) subframes model generic only encoding module 854, to keep the bit-rate as low as possible, an ACELP search as described in clause 5.2.3.1 of Reference [1] is used. In the four (4) subframes model generic only encoding, the pitch information can be re-used from the primary channel or not. The coding parameters found during the ACELP search in the four (4) subframes model generic only encoding module 854 are then used to construct the secondary channel bitstream 206/306 and sent to the multiplexer 254/354 for inclusion in the multiplexed bitstream 207/307.

In the alternative two (2) subframes model encoding operation 805 and the corresponding alternative two (2) subframes model encoding module 855, the generic coding model is constructed similarly to ACELP as described in clause 5.2.3.1 of Reference [1], but it is used with only two (2) sub-frames by frame. Thus, to do so, the length of the subframes is increased from 64 samples to 128 samples, still keeping the internal sampling rate at 12.8 kHz. If the pitch coherence analyzer 1552 has determined to re-use the pitch information from the primary channel Y for encoding the secondary channel X, then the average of the pitches of the first two subframes of the primary channel Y is computed and used as the pitch estimation for the first half frame of the secondary channel X. Similarly, the average of the pitches of the last two subframes of the primary channel Y is computed and used for the second half frame of the secondary channel X. When re-used from the primary channel Y, the LP filter coefficients are interpolated and interpolation of the LP filter coefficients as described in clause 5.2.2.1 of Reference [1] is modified to adapt to a two (2) subframes scheme by replacing the first and third interpolation factors with the second and fourth interpolation factors.

In the embodiment of FIG. 15, the process to decide between the four (4) subframes and the two (2) subframes encoding scheme is driven by the bit budget available for encoding the secondary channel X. As mentioned previously, the bit budget of the secondary channel X is derived from different elements such as the total bit budget available, the factor β or the energy normalization factor ε, the presence or not of a temporal delay correction (TDC) module, the possibility or not to re-use the LP filter coefficients and/or the pitch information from the primary channel Y.

The absolute minimum bit rate used by the two (2) subframes encoding model of the secondary channel X when both the LP filter coefficients and the pitch information are re-used from the primary channel Y is around 2 kb/s for a generic signal while it is around 3.6 kb/s for the four (4) subframes encoding scheme. For an ACELP-like coder, using a two (2) or four (4) subframes encoding model, a large part of the quality is coming from the number of bit that can be allocated to the algebraic codebook (ACB) search as defined in clause 5.2.3.1.5 of reference [1].

Then, to maximize the quality, the idea is to compare the bit budget available for both the four (4) subframes algebraic codebook (ACB) search and the two (2) subframes algebraic codebook (ACB) search after that all what will be coded is taken into account. For example, if, for a specific frame, there is 4 kb/s (80 bits per 20 ms frame) available to code the secondary channel X and the LP filter coefficient can be re-used while the pitch information needs to be transmitted. Then is removed from the 80 bits, the minimum amount of bits for encoding the secondary channel signaling, the secondary channel pitch information, the gains, and the algebraic codebook for both the two (2) subframes and the four (4) subframes, to get the bit budget available to encode the algebraic codebook. For example, the four (4) subframes encoding model is chosen if at least 40 bits are available to encode the four (4) subframes algebraic codebook otherwise, the two (2) subframe scheme is used.

3) Approximating the Mono Signal from a Partial Bitstream

As described in the foregoing description, the time domain down-mixing is mono friendly, meaning that in case of an embedded structure, where the primary channel Y is encoded with a legacy codec (It should be kept in mind that, as mentioned in the foregoing description, any suitable type of encoder can be used as the primary channel encoder 252/352) and the stereo bits are appended to the primary channel bitstream, the stereo bits could be stripped-off and a legacy decoder could create a synthesis that is subjectively close to an hypothetical mono synthesis. To do so, simple energy normalization is needed on the encoder side, before encoding the primary channel Y. By rescaling the energy of the primary channel Y to a value sufficiently close to an energy of a monophonic signal version of the sound, decoding of the primary channel Y with a legacy decoder can be similar to decoding by the legacy decoder of the monophonic signal version of the sound. The function of the energy normalization is directly linked to the linearized long-term correlation difference $G_{LR}'(t)$ computed using relation (7) and is computed using relation (22):

$$\varepsilon=-0.485\cdot G_{LR}'(t)^2+0.9765\cdot G_{LR}'(t)+0.5. \tag{22}$$

The level of normalization is shown in FIG. 5. In practice, instead of using relation (22), a look-up table is used relating the normalization values ε to each possible value of the factor β (31 values in this example embodiment). Even if this extra step is not required when encoding a stereo sound signal, for example speech and/or audio, with the integrated model, this can be helpful when decoding only the mono signal without decoding the stereo bits.

4) Stereo Decoding and Up-Mixing

Figure 10:
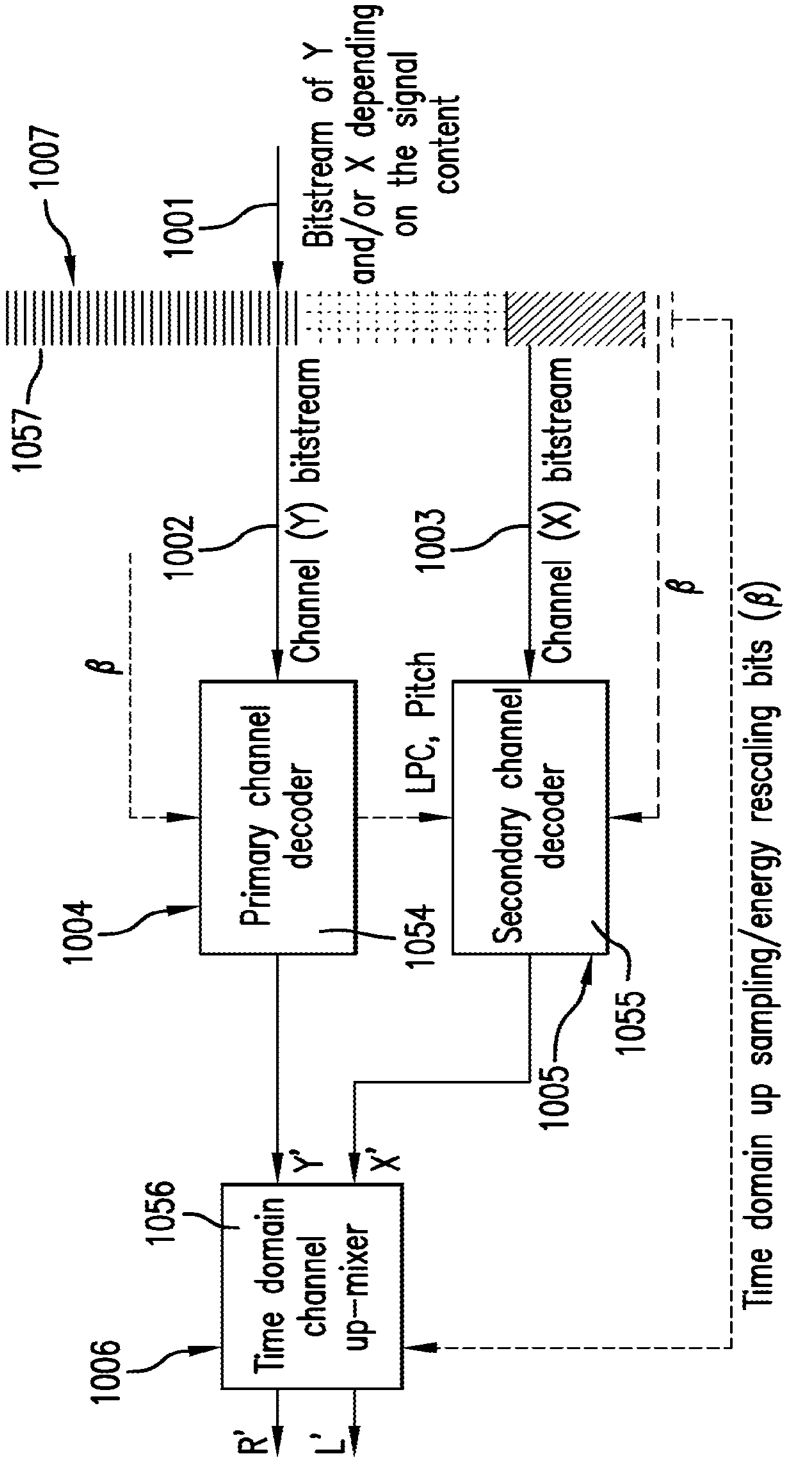
FIG. 10 is a block diagram illustrating concurrently a stereo sound decoding method and stereo sound decoding system.
Figure 11:
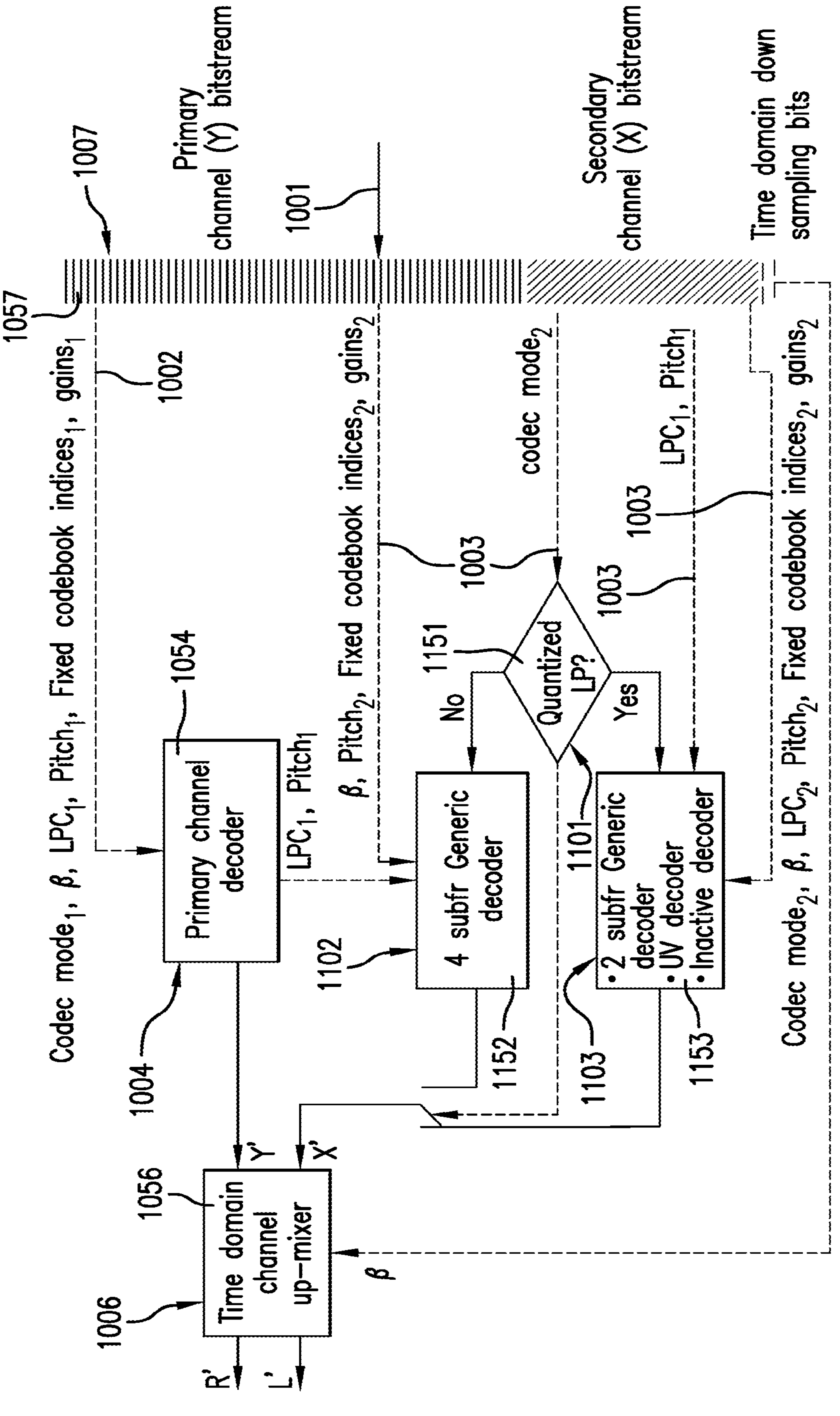
FIG. 11 is a block diagram illustrating additional features of the stereo sound decoding method and system of FIG. 10.

FIG. 10 is a block diagram illustrating concurrently a stereo sound decoding method and stereo sound decoding system. FIG. 11 is a block diagram illustrating additional features of the stereo sound decoding method and stereo sound decoding system of FIG. 10.

The stereo sound decoding method of FIGS. 10 and 11 comprises a demultiplexing operation 1007 implemented by a demultiplexer 1057, a primary channel decoding operation 1004 implemented by a primary channel decoder 1054, a secondary channel decoding operation 1005 implemented by a secondary channel decoder 1055, and a time domain up-mixing operation 1006 implemented by a time domain channel up-mixer 1056. The secondary channel decoding operation 1005 comprises, as shown in FIG. 11, a decision operation 1101 implemented by a decision module 1151, a four (4) subframes generic decoding operation 1102 implemented by a four (4) subframes generic decoder 1152, and a two (2) subframes generic/unvoiced/inactive decoding operation 1103 implemented by a two (2) subframes generic/unvoiced/inactive decoder 1153.

At the stereo sound decoding system, a bitstream 1001 is received from an encoder. The demultiplexer 1057 receives the bitstream 1001 and extracts therefrom encoding parameters of the primary channel Y (bitstream 1002), encoding parameters of the secondary channel X (bitstream 1003), and the factor β supplied to the primary channel decoder 1054, the secondary channel decoder 1055 and the channel up-mixer 1056. As mentioned earlier, the factor β is used as an indicator for both the primary channel encoder 252/352 and the secondary channel encoder 253/353 to determine the bit-rate allocation, thus the primary channel decoder 1054 and the secondary channel decoder 1055 are both re-using the factor β to decode the bitstream properly.

The primary channel encoding parameters correspond to the ACELP coding model at the received bit-rate and could be related to a legacy or modified EVS coder (It should be kept in mind here that, as mentioned in the foregoing description, any suitable type of encoder can be used as the primary channel encoder 252). The primary channel decoder 1054 is supplied with the bitstream 1002 to decode the primary channel encoding parameters (codec $mode_1$, β, $LPC_1$, $Pitch_1$, fixed codebook $indices_1$, and $gains_1$ as shown in FIG. 11) using a method similar to Reference [1] to produce a decoded primary channel Y'.

The secondary channel encoding parameters used by the secondary channel decoder 1055 correspond to the model used to encode the second channel X and may comprise:

(a) The generic coding model with re-use of the LP filter coefficients ($LPC_1$) and/or other encoding parameters (such as, for example, the pitch lag $Pitch_1$) from the primary channel Y. The four (4) subframes generic decoder 1152 (FIG. 11) of the secondary channel decoder 1055 is supplied with the LP filter coefficients ($LPC_1$) and/or other encoding parameters (such as, for example, the pitch lag $Pitch_1$) from the primary channel Y from decoder 1054 and/or with the bitstream 1003 (β, $Pitch_2$, fixed codebook $indices_2$, and $gains_2$ as shown in FIG. 11) and uses a method inverse to that of the encoding module 854 (FIG. 8) to produce the decoded secondary channel X'.

(b) Other coding models may or may not re-use the LP filter coefficients ($LPC_1$) and/or other encoding parameters (such as, for example, the pitch lag $Pitch_1$) from the primary channel Y, including the half-band generic coding model, the low rate unvoiced coding model, and the low rate inactive coding model. As an example, the inactive coding model may re-use the primary channel LP filter coefficients $LPC_1$. The two (2) subframes generic/unvoiced/inactive decoder 1153 (FIG. 11) of the secondary channel decoder 1055 is supplied with the LP filter coefficients ($LPC_1$) and/or other encoding parameters (such as, for example, the pitch lag $Pitch_1$) from the primary channel Y and/or with the secondary channel encoding parameters from the bitstream 1003 (codec $mode_2$, β, $LPC_2$, $Pitch_2$, fixed codebook $indices_2$, and $gains_2$ as shown in FIG. 11) and uses methods inverse to those of the encoding module 855 (FIG. 8) to produce the decoded secondary channel X'.

The received encoding parameters corresponding to the secondary channel X (bitstream 1003) contain information (codec $mode_2$) related to the coding model being used. The decision module 1151 uses this information (codec $mode_2$) to determine and indicate to the four (4) subframes generic decoder 1152 and the two (2) subframes generic/unvoiced/inactive decoder 1153 which coding model is to be used.

In case of an embedded structure, the factor β is used to retrieve the energy scaling index that is stored in a look-up table (not shown) on the decoder side and used to rescale the primary channel Y' before performing the time domain up-mixing operation 1006. Finally the factor β is supplied to the channel up-mixer 1056 and used for up-mixing the decoded primary Y' and secondary X' channels. The time domain up-mixing operation 1006 is performed as the inverse of the down-mixing relations (9) and (10) to obtain the decoded right R' and left L' channels, using relations (23) and (24):

$$L'(n) = \frac{\beta(t)\cdot Y'(n) - \beta(t)\cdot X'(n) + X'(n)}{2\cdot\beta(t)^2 - 2\cdot\beta(t) + 1}, \tag{23}$$

$$R'(n) = \frac{-\beta(t)\cdot(Y'(n) + X'(n)) + Y'(n)}{2\cdot\beta(t)^2 - 2\cdot\beta(t) + 1}, \tag{24}$$

where n=0, . . . , N−1 is the index of the sample in the frame and t is the frame index.

5) Integration of Time Domain and Frequency Domain Encoding

For applications of the present technique where a frequency domain coding mode is used, performing the time down-mixing in the frequency domain to save some complexity or to simplify the data flow is also contemplated. In such cases, the same mixing factor is applied to all spectral coefficients in order to maintain the advantages of the time domain down mixing. It may be observed that this is a departure from applying spectral coefficients per frequency band, as in the case of most of the frequency domain down-mixing applications. The down mixer 456 may be adapted to compute relations (25.1) and (25.2):

$$F_Y(k) = F_R(k)\cdot(1-\beta(t)) + F_L(k)\cdot\beta(t) \tag{25.1}$$

$$F_X(k) = F_L(k)\cdot(1-\beta(t)) - F_R(k)\cdot\beta(t), \tag{25.2}$$

where $F_R(k)$ represents a frequency coefficient k of the right channel R and, similarly, $F_L(k)$ represents a frequency coefficient k of the left channel L. The primary Y and secondary X channels are then computed by applying an inverse frequency transform to obtain the time representation of the down mixed signals.

Figure 17:
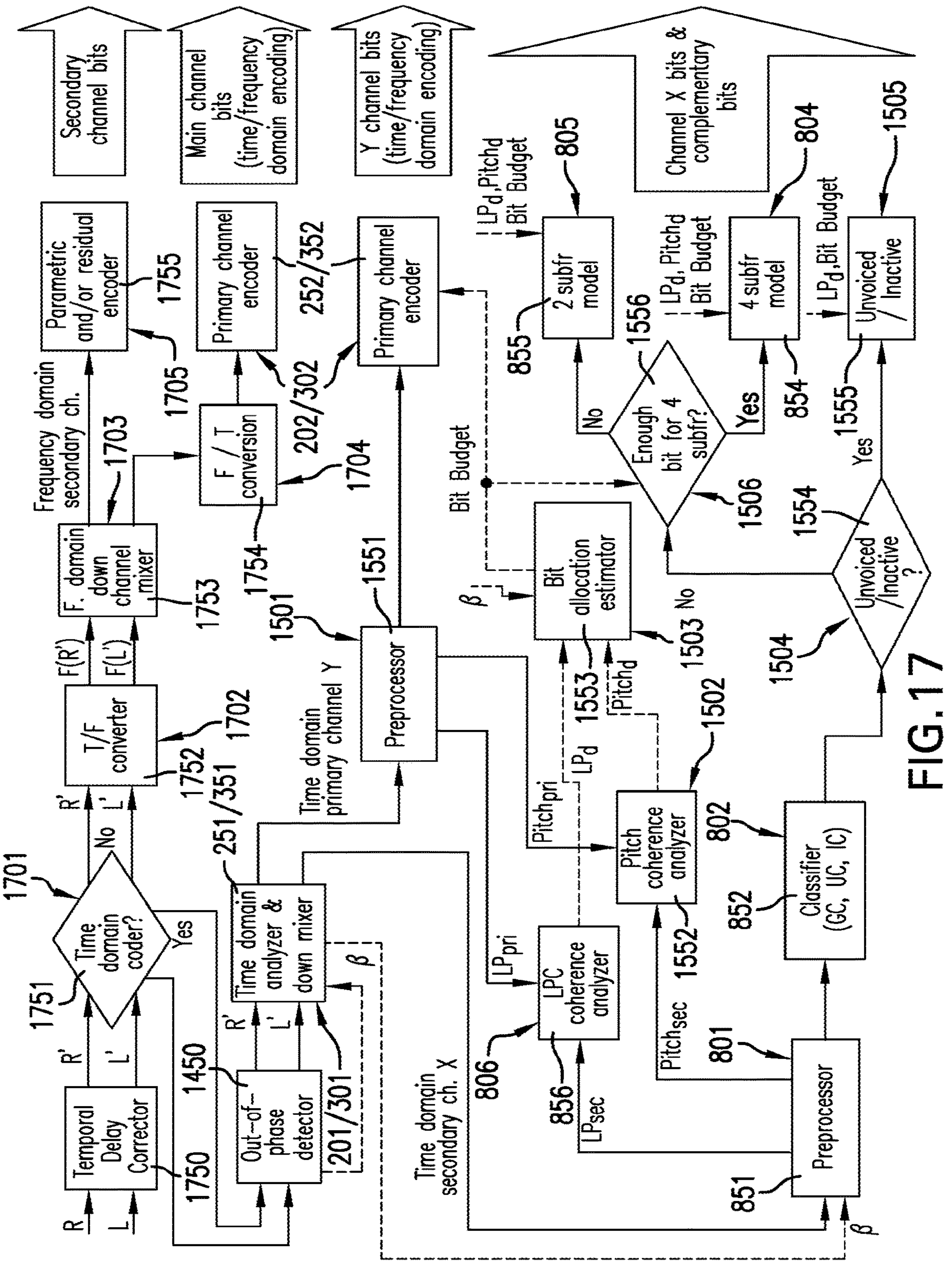
FIG. 17 is a block diagram illustrating concurrently stereo encoding method and system using time-domain down mixing with a capability of operating in the time-domain and in the frequency domain.
Figure 18:
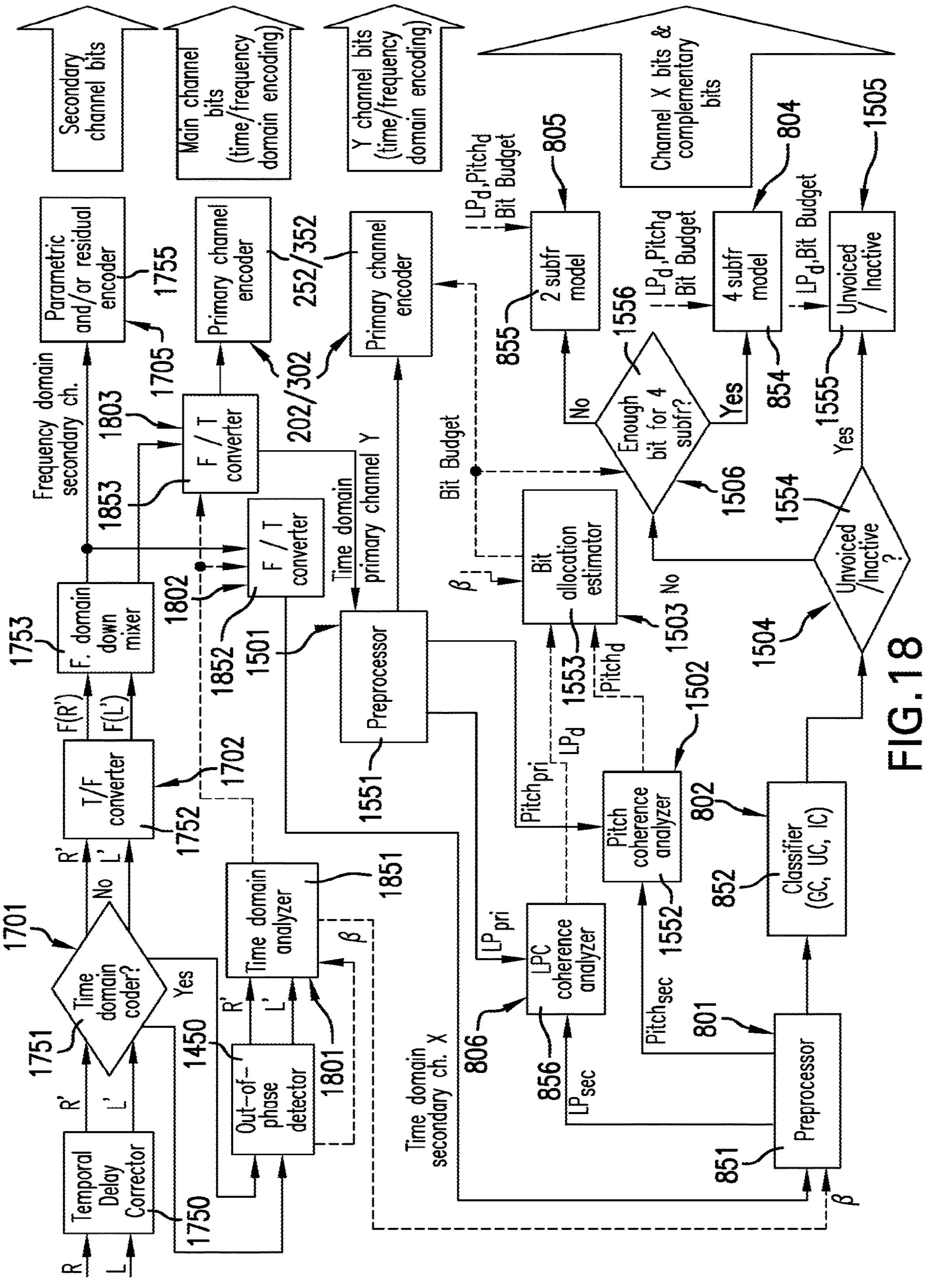
FIG. 18 is a block diagram illustrating concurrently other stereo encoding method and system using time-domain down mixing with a capability of operating in the time-domain and in the frequency domain.

FIGS. 17 and 18 show possible implementations of time domain stereo encoding method and system using frequency domain down mixing capable of switching between time domain and frequency domain coding of the primary Y and secondary X channels.

A first variant of such method and system is shown in FIG. 17, which is a block diagram illustrating concurrently stereo encoding method and system using time-domain down-switching with a capability of operating in the time-domain and in the frequency domain.

In FIG. 17, the stereo encoding method and system includes many previously described operations and modules described with reference to previous figures and identified by the same reference numerals. A decision module 1751 (decision operation 1701) determines whether left L' and right R' channels from the temporal delay corrector 1750 should be encoded in the time domain or in the frequency domain. If time domain coding is selected, the stereo encoding method and system of FIG. 17 operates substantially in the same manner as the stereo encoding method and system of the previous figures, for example and without limitation as in the embodiment of FIG. 15.

If the decision module 1751 selects frequency coding, a time-to-frequency converter 1752 (time-to-frequency converting operation 1702) converts the left L' and right R' channels to frequency domain. A frequency domain down mixer 1753 (frequency domain down mixing operation 1703) outputs primary Y and secondary X frequency domain channels. The frequency domain primary channel is converted back to time domain by a frequency-to-time converter 1754 (frequency-to-time converting operation 1704) and the resulting time domain primary channel Y is applied to the primary channel encoder 252/352. The frequency domain secondary channel X from the frequency domain down mixer 1753 is processed through a conventional parametric and/or residual encoder 1755 (parametric and/or residual encoding operation 1705).

FIG. 18 is a block diagram illustrating concurrently other stereo encoding method and system using frequency domain down mixing with a capability of operating in the time-domain and in the frequency domain. In FIG. 18, the stereo encoding method and system are similar to the stereo encoding method and system of FIG. 17 and only the new operations and modules will be described.

A time domain analyzer 1851 (time domain analyzing operation 1801) replaces the earlier described time domain channel mixer 251/351 (time domain down mixing operation 201/301). The time domain analyzer 1851 includes most of the modules of FIG. 4, but without the time domain down mixer 456. Its role is thus in a large part to provide a calculation of the factor β. This factor β is supplied to the pre-processor 851 and to frequency-to-time domain converters 1852 and 1853 (frequency-to-time domain converting operations 1802 and 1803) that respectively convert to time domain the frequency domain secondary X and primary Y channels received from the frequency domain down mixer 1753 for time domain encoding. The output of the converter 1852 is thus a time domain secondary channel X that is provided to the preprocessor 851 while the output of the converter 1852 is a time domain primary channel Y that is provided to both the preprocessor 1551 and the encoder 252/352.

6) Example Hardware Configuration

Figure 12:
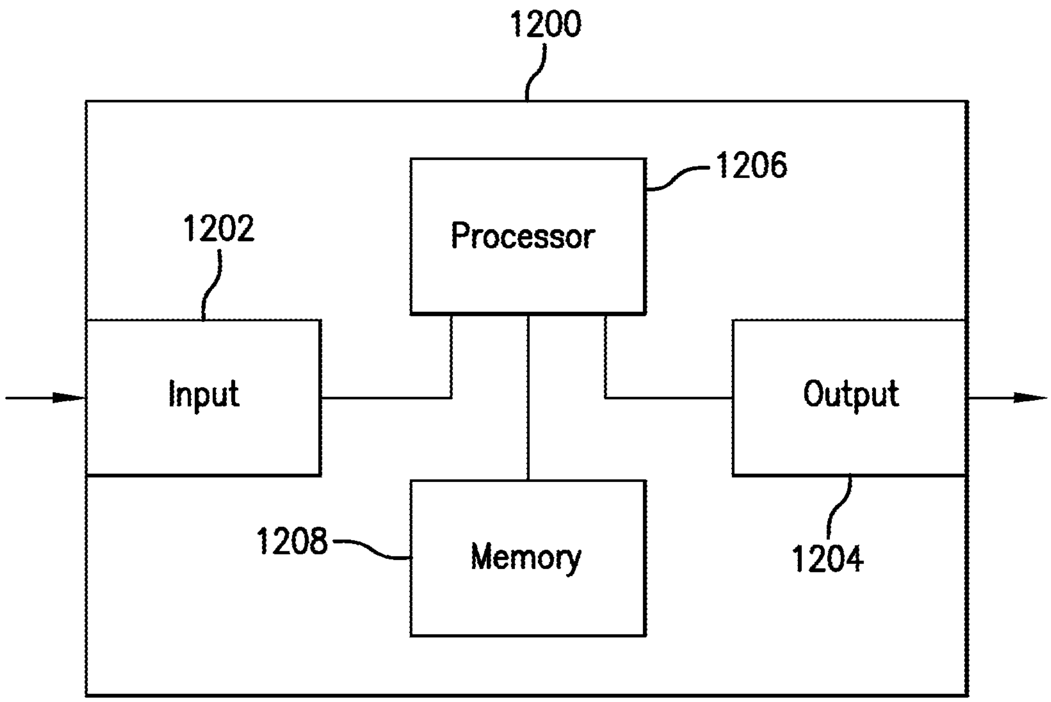
FIG. 12 is a simplified block diagram of an example configuration of hardware components forming the stereo sound encoding system and the stereo sound decoder of the present disclosure.

FIG. 12 is a simplified block diagram of an example configuration of hardware components forming each of the above described stereo sound encoding system and stereo sound decoding system.

Each of the stereo sound encoding system and stereo sound decoding system may be implemented as a part of a mobile terminal, as a part of a portable media player, or in any similar device. Each of the stereo sound encoding system and stereo sound decoding system (identified as 1200 in FIG. 12) comprises an input 1202, an output 1204, a processor 1206 and a memory 1208.

The input 1202 is configured to receive the left L and right R channels of the input stereo sound signal in digital or analog form in the case of the stereo sound encoding system, or the bitstream 1001 in the case of the stereo sound decoding system. The output 1204 is configured to supply the multiplexed bitstream 207/307 in the case of the stereo sound encoding system or the decoded left channel L' and right channel R' in the case of the stereo sound decoding system. The input 1202 and the output 1204 may be implemented in a common module, for example a serial input/output device.

The processor 1206 is operatively connected to the input 1202, to the output 1204, and to the memory 1208. The processor 1206 is realized as one or more processors for executing code instructions in support of the functions of the various modules of each of the stereo sound encoding system as shown in FIGS. 2, 3, 4, 8, 9, 13, 14, 15, 16, 17 and 18 and the stereo sound decoding system as shown in FIGS. 10 and 11.

The memory 1208 may comprise a non-transient memory for storing code instructions executable by the processor 1206, specifically, a processor-readable memory comprising non-transitory instructions that, when executed, cause a processor to implement the operations and modules of the stereo sound encoding method and system and the stereo sound decoding method and system as described in the present disclosure. The memory 1208 may also comprise a random access memory or buffer(s) to store intermediate processing data from the various functions performed by the processor 1206.

Those of ordinary skill in the art will realize that the description of the stereo sound encoding method and system and the stereo sound decoding method and system are illustrative only and are not intended to be in any way limiting. Other embodiments will readily suggest themselves to such persons with ordinary skill in the art having the benefit of the present disclosure. Furthermore, the disclosed stereo sound encoding method and system and stereo sound decoding method and system may be customized to offer valuable solutions to existing needs and problems of encoding and decoding stereo sound.

In the interest of clarity, not all of the routine features of the implementations of the stereo sound encoding method and system and the stereo sound decoding method and system are shown and described. It will, of course, be appreciated that in the development of any such actual implementation of the stereo sound encoding method and system and the stereo sound decoding method and system, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

Modules of the stereo sound encoding method and system and the stereo sound decoding method and decoder as described herein may comprise software, firmware, hardware, or any combination(s) of software, firmware, or hardware suitable for the purposes described herein.

In the stereo sound encoding method and the stereo sound decoding method as described herein, the various operations and sub-operations may be performed in various orders and some of the operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

REFERENCES

The following references are referred to in the present specification and the full contents thereof are incorporated herein by reference.

[1] 3GPP TS 26.445, v. 12.0.0, "Codec for Enhanced Voice Services (EVS); Detailed Algorithmic Description", September 2014.

[2] M. Neuendorf, M. Multrus, N. Rettelbach, G. Fuchs, J. Robillard, J. Lecompte, S. Wilde, S. Bayer, S. Disch, C. Helmrich, R. Lefevbre, P. Gournay, et al., "The ISO/MPEG Unified Speech and Audio Coding Standard—Consistent High Quality for All Content Types and at All Bit Rates", *J. Audio Eng. Soc.*, vol. 61, no. 12, pp. 956-977, December 2013.

[3] B. Bessette, R. Salami, R. Lefebvre, M. Jelinek, J. Rotola-Pukkila, J. Vainio, H. Mikkola, and K. Järvinen, "The Adaptive Multi-Rate Wideband Speech Codec (AMR-WB)," *Special Issue of IEEE Trans. Speech and Audio Proc.*, Vol. 10, pp. 620-636, November 2002.

[4] R. G. van der Waal & R. N. J. Veldhuis, "Subband coding of stereophonic digital audio signals", *Proc. IEEE ICASSP*, Vol. 5, pp. 3601-3604, April 1991

[5] Dai Yang, Hongmei Ai, Chris Kyriakakis and C.-C. Jay Kuo, "High-Fidelity Multichannel Audio Coding With Karhunen-Loève Transform", *IEEE Trans. Speech and Audio Proc.*, Vol. 11, No. 4, pp. 365-379, July 2003.

[6] J. Breebaart, S. van de Par, A. Kohlrausch and E. Schuijers, "Parametric Coding of Stereo Audio", *EURASIP Journal on Applied Signal Processing*, Issue 9, pp. 1305-1322, 2005

[7] 3GPP TS 26.290 V9.0.0, "Extended Adaptive Multi-Rate—Wideband (AMR-WB+) codec; Transcoding functions (Release 9)", September 2009.

[8] Jonathan A. Gibbs, "Apparatus and method for encoding a multi-channel audio signal", U.S. Pat. No. 8,577,045 B2

What is claimed is:

1. A stereo sound decoding method for decoding left and right channels of a stereo sound signal, comprising:

receiving a bitstream from a stereo sound encoder and extracting from the bitstream encoding parameters of a primary channel, encoding parameters of a secondary channel, and a factor β, wherein the primary channel encoding parameters comprise LP filter coefficients of the primary channel;

decoding the primary channel in response to the primary channel encoding parameters, using the factor β as an indicator of bit-rate allocation to the primary channel; and decoding the secondary channel using one of a plurality of coding models and the factor β as an indicator of bit-rate allocation to the secondary channel, wherein (a) at least one of the coding models uses the primary channel LP filter coefficients to decode the secondary channel, and (b) at least one of the coding models uses primary channel encoding parameters other than the LP filter coefficients to decode the secondary channel;

retrieving an energy scaling index using the factor β and rescaling the decoded primary channel using the energy scaling index; and producing the decoded left and right channels using the rescaled decoded primary channel and the decoded secondary channel.

2. A stereo sound decoding method, comprising:

receiving encoding parameters comprising encoding parameters of a primary channel and encoding parameters of a secondary channel, wherein the primary channel encoding parameters comprise LP filter coefficients of the primary channel;

decoding the primary channel in response to the primary channel encoding parameters; and decoding the secondary channel using one of a plurality of coding models, wherein (a) at least one of the coding models uses the primary channel LP filter coefficients to decode the secondary channel, and (b) at least one of the coding models uses primary channel encoding parameters other than the LP filter coefficients to decode the secondary channel;

wherein the coding models comprise a generic coding model, an unvoiced coding model and an inactive coding model.

3. A stereo sound decoding method, comprising:

receiving encoding parameters comprising encoding parameters of a primary channel and encoding parameters of a secondary channel, wherein the primary channel encoding parameters comprise LP filter coefficients of the primary channel;

decoding the primary channel in response to the primary channel encoding parameters; and decoding the secondary channel using one of a plurality of coding models, wherein (a) at least one of the coding models uses the primary channel LP filter coefficients to decode the secondary channel, and (b) at least one of the coding models uses primary channel encoding parameters other than the LP filter coefficients to decode the secondary channel;

wherein the secondary channel encoding parameters comprise information identifying one of the coding models to be used upon decoding the secondary channel.

4. A stereo sound decoding system for decoding left and right channels of a stereo sound signal, comprising:

at least one processor; and a memory coupled to the processor and comprising non-transitory instructions that when executed cause the processor to implement:

means for receiving a bitstream from a stereo sound encoder and for extracting from the bitstream encoding parameters of a primary channel, encoding parameters of a secondary channel, and a factor β, wherein the primary channel encoding parameters comprise LP filter coefficients of the primary channel;

a decoder of the primary channel in response to the primary channel encoding parameters, using the factor β as an indicator of bit-rate allocation to the primary channel;

a decoder of the secondary channel using one of a plurality of coding models and the factor β as an indicator of bit-rate allocation to the secondary channel, wherein (a) at least one of the coding models uses the primary channel LP filter coefficients to decode the secondary channel, and (b) at least one of the coding models uses primary channel encoding parameters other than the LP filter coefficients to decode the secondary channel;

means for retrieving an energy scaling index using the factor β and for rescaling the decoded primary channel using the energy scaling index; and means for producing the decoded left and right channels using the rescaled decoded primary channel and the decoded secondary channel.

5. A stereo sound decoding system, comprising:

at least one processor; and a memory coupled to the processor and comprising non-transitory instructions that when executed cause the processor to implement:

means for receiving encoding parameters comprising encoding parameters of a primary channel and encoding parameters of a secondary channel, wherein the primary channel encoding parameters comprise LP filter coefficients of the primary channel;

a decoder of the primary channel in response to the primary channel encoding parameters; and a decoder of the secondary channel using one of a plurality of coding models, wherein (a) at least one of the coding models uses the primary channel LP filter coefficients to decode the secondary channel, and (b) at least one of the coding models uses primary channel encoding parameters other than the LP filter coefficients to decode the secondary channel;

wherein the secondary channel decoder comprises a first decoder using a generic coding model, and a second decoder using one of the generic coding model, an unvoiced coding model and an inactive coding model.

6. A stereo sound decoding system as defined in claim 5, wherein the secondary channel encoding parameters comprise information identifying one of the coding models to be used upon decoding the secondary channel, and wherein the stereo sound decoding system comprises a decision module for indicating to the first and second decoders the coding model to be used upon decoding the secondary channel.

7. A stereo sound decoding system for decoding left and right channels of a stereo sound signal, comprising:

a demultiplexer for receiving a bitstream from a stereo sound encoder and for extracting from the bitstream encoding parameters of a primary channel, encoding parameters of a secondary channel, and a factor β, wherein the primary channel encoding parameters comprise LP filter coefficients of the primary channel;

a decoder of the primary channel in response to the primary channel encoding parameters, using the factor β as an indicator of bit-rate allocation to the primary channel;

a decoder of the secondary channel using one of a plurality of coding models and the factor β as an indicator of bit-rate allocation to the secondary channel, wherein (a) at least one of the coding models uses the primary channel LP filter coefficients to decode the secondary channel, and (b) at least one of the coding models uses primary channel encoding parameters other than the LP filter coefficients to decode the secondary channel; and a look-up table for retrieving an energy scaling index using the factor β to rescale the decoded primary channel using the energy scaling index;

wherein the decoded left and right channels are produced using the rescaled decoded primary channel and the decoded secondary channel.

8. A stereo sound decoding system for decoding left and right channels of a stereo sound signal, comprising:

at least one processor; and a memory coupled to the processor and comprising non-transitory instructions that when executed cause the processor to:

receive a bitstream from a stereo sound encoder and for extracting from the bitstream encoding parameters of a primary channel, encoding parameters of a secondary channel, and a factor β, wherein the primary channel encoding parameters comprise LP filter coefficients of the primary channel;

decode the primary channel in response to the primary channel encoding parameters, using the factor β as an indicator of bit-rate allocation to the primary channel;

decode the secondary channel using one of a plurality of coding models and the factor β as an indicator of bit-rate allocation to the secondary channel, wherein (a) at least one of the coding models uses the primary channel LP filter coefficients to decode the secondary channel, and (b) at least one of the coding models uses primary channel encoding parameters other than the LP filter coefficients to decode the secondary channel;

retrieve an energy scaling index using the factor β and rescale the decoded primary channel using the energy scaling index; and produce the decoded left and right channels using the rescaled decoded primary channel and the decoded secondary channel.

9. A stereo sound decoding system as defined in claim 4, wherein the receiving and extracting means comprises a demultiplexer for receiving the bitstream and for extracting from the bitstream the primary channel encoding parameters, the secondary channel encoding parameters, and the factor β.

* * * * *